(12) United States Patent
Usami et al.

(10) Patent No.: US 10,635,301 B2
(45) Date of Patent: Apr. 28, 2020

(54) TOUCH TYPE OPERATION DEVICE, AND OPERATION METHOD AND OPERATION PROGRAM THEREOF

(71) Applicant: FUJIFILM Corporation, Tokyo (JP)

(72) Inventors: Yoshihisa Usami, Tokyo (JP); Naoki Tsukamoto, Tokyo (JP); Yusuke Kitagawa, Tokyo (JP); Yuki Okabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

(21) Appl. No.: 15/950,190

(22) Filed: Apr. 11, 2018

(65) Prior Publication Data

US 2018/0329623 A1 Nov. 15, 2018

(30) Foreign Application Priority Data

May 10, 2017 (JP) .................. 2017-093662

(51) Int. Cl.
*G06F 3/0488* (2013.01)
*G06F 3/041* (2006.01)
(Continued)

(52) U.S. Cl.
CPC .......... *G06F 3/04883* (2013.01); *B60K 35/00* (2013.01); *B60K 37/06* (2013.01); *G01C 21/367* (2013.01); *G01C 21/3664* (2013.01); *G06F 3/03547* (2013.01); *G06F 3/041* (2013.01); *G06F 3/04845* (2013.01); *B60K 2370/1438* (2019.05); *B60K 2370/1442* (2019.05);
(Continued)

(58) Field of Classification Search
CPC .............. B60K 35/00; B60K 37/06; B60K 2370/1438; B60K 2370/1442; B60K 2370/1464; B60K 2370/1531; B60K 2370/1533; B60K 2370/52; G01C 21/3664; G01C 21/367; G06F 3/03547; G06F 3/041; G06F 3/04845; G06F 3/04847; G06F 3/04883; G06F 2203/04102; G06F 2203/04103; G06F 2203/04104; G06F 2203/04806; G06F 2203/04808

See application file for complete search history.

(56) References Cited

U.S. PATENT DOCUMENTS 5,805,137 A * 9/1998 Yasutake ............... G06F 3/0338
341/34
5,825,352 A * 10/1998 Bisset .................... G06F 3/044
345/173

(Continued)

FOREIGN PATENT DOCUMENTS

JP 2014215817 11/2014

*Primary Examiner* — Mihir K Rayan
(74) *Attorney, Agent, or Firm* — JCIPRNET

(57) ABSTRACT

A touch pad includes a flat portion and a convex type three-dimensional portion having a hemispherical shape. An outer circumferential surface of the three-dimensional portion constitutes a spherical operation area. A second recognition unit of the touch-pad controller recognizes a gesture operation of at least two fingers to be the same gesture operation as a pinch-in operation in a planar operation area, in a case where movement trajectories of the at least two fingers in the spherical operation area are arc-shaped movement trajectories which are bulged outwardly in a case where the spherical operation area is viewed in a plan view.

16 Claims, 32 Drawing Sheets

(51) Int. Cl.
  *G06F 3/0484* (2013.01)
  *B60K 37/06* (2006.01)
  *G01C 21/36* (2006.01)
  *G06F 3/0354* (2013.01)
  *B60K 35/00* (2006.01)

(52) U.S. Cl.
  CPC ............... *B60K 2370/1464* (2019.05); *B60K 2370/1531* (2019.05); *B60K 2370/1533* (2019.05); *B60K 2370/52* (2019.05); *G06F 3/04847* (2013.01); *G06F 2203/04102* (2013.01); *G06F 2203/04103* (2013.01); *G06F 2203/04104* (2013.01); *G06F 2203/04806* (2013.01); *G06F 2203/04808* (2013.01)

(56) References Cited

U.S. PATENT DOCUMENTS

| | | | |
|---|---|---|---|
| 9,323,444 B2* | 4/2016 | Nishio | G06F 3/04883 |
| 2005/0179651 A1* | 8/2005 | Ludwig | G06F 3/0346 345/156 |
| 2007/0183685 A1* | 8/2007 | Wada | G06K 9/32 382/285 |
| 2009/0284478 A1* | 11/2009 | De la Torre Baltierra | G06F 3/04883 345/173 |
| 2010/0020026 A1* | 1/2010 | Benko | G06F 3/041 345/173 |
| 2011/0191675 A1* | 8/2011 | Kauranen | G06F 3/04847 715/702 |
| 2012/0032916 A1* | 2/2012 | Enoki | G06F 3/044 345/174 |
| 2013/0147743 A1* | 6/2013 | Ludwig | G06F 3/044 345/173 |
| 2014/0368436 A1* | 12/2014 | Abzarian | G06F 3/0488 345/168 |
| 2016/0162037 A1* | 6/2016 | Park | G06F 3/017 345/156 |
| 2019/0087020 A1* | 3/2019 | Robinson | G06F 3/0488 |

* cited by examiner

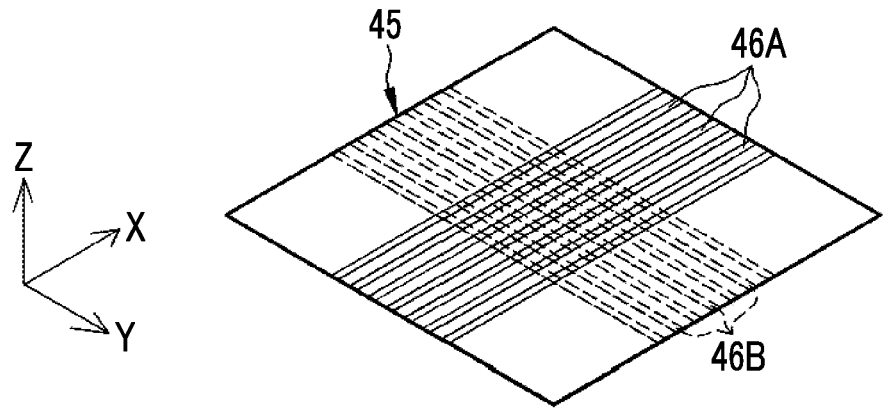
FIG. 9A
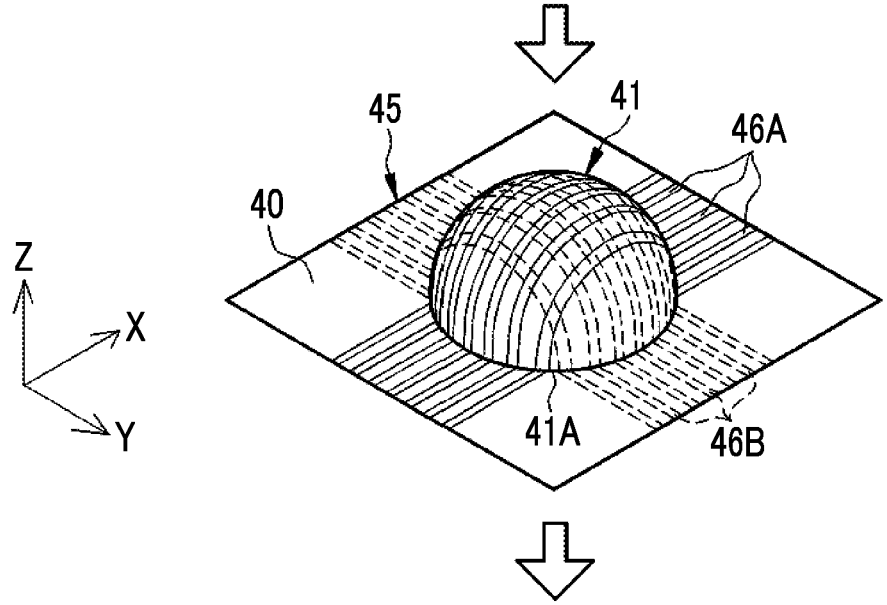
FIG. 9B
FIG. 9C
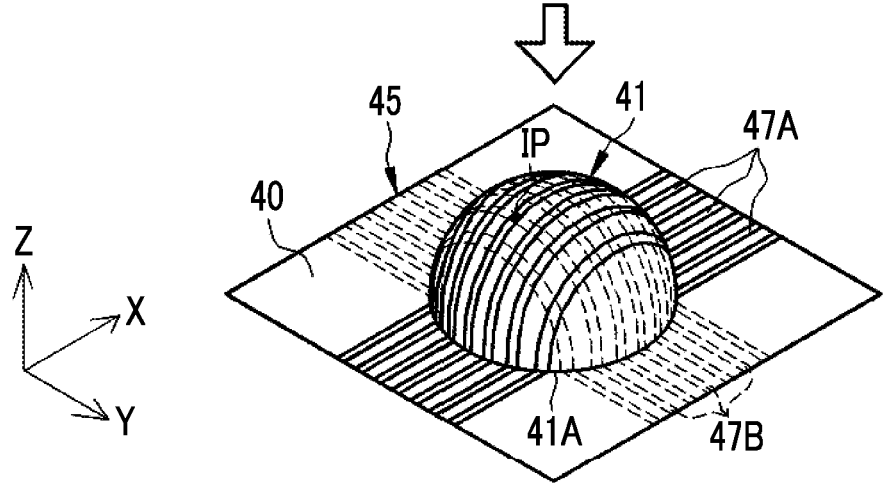
FIG. 9D

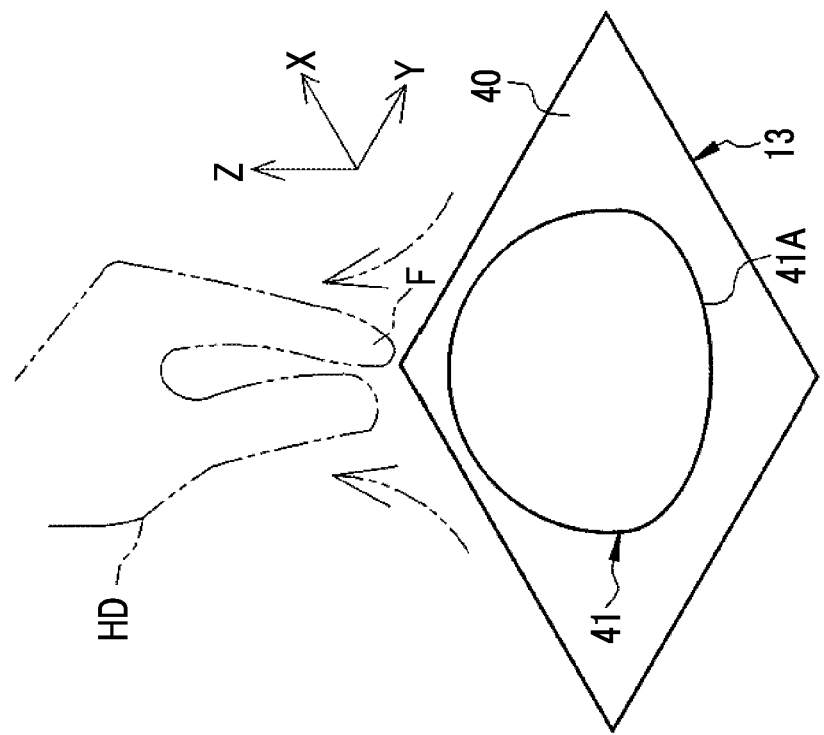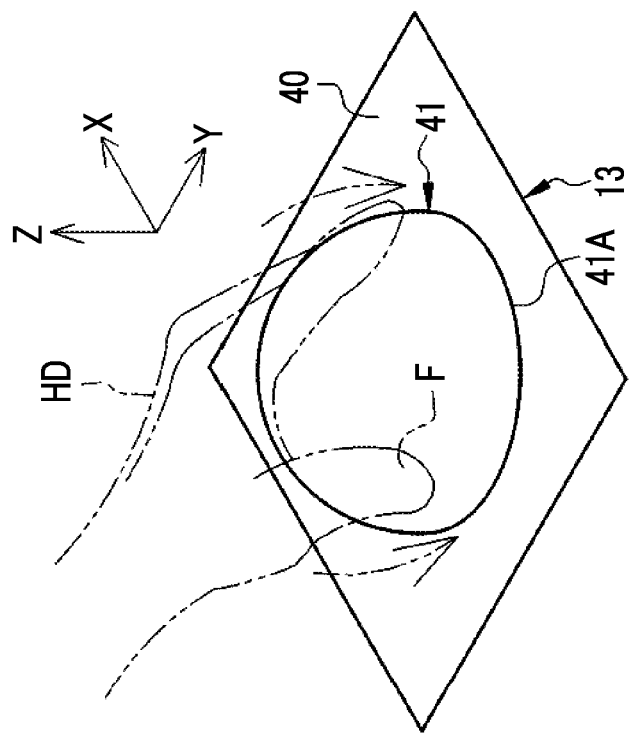

FIG. 20

| OPERATION RECOGNITION INFORMATION 52 | | | |
|---|---|---|---|
| CONTACT POSITION | NUMBER OF FINGERS IN CONTACT | MOVEMENT TRAJECTORY | GESTURE OPERATION |
| LOWER CIRCUMFERENCE (XRP1, YRP1) | AT LEAST TWO | ALONG LOWER CIRCUMFERENCE | ROTARY SLIDE OPERATION |
| THREE-DIMENSIONAL PORTION (XRP2, YRP2) | AT LEAST ONE | NONE (ONCE) | SINGLE TAP OPERATION |
| THREE-DIMENSIONAL PORTION (XRP2, YRP2) | AT LEAST ONE | NONE (TWICE) | DOUBLE TAP OPERATION |
| THREE-DIMENSIONAL PORTION (XRP2, YRP2) | AT LEAST ONE | ALONG THREE-DIMENSIONAL PORTION | STROKE OPERATION |
| THREE-DIMENSIONAL PORTION (XRP2, YRP2) | AT LEAST TWO | ARC SHAPE or ALONG CENTER LINE (BECOMING CLOSER) | PINCH-IN OPERATION |
| THREE-DIMENSIONAL PORTION (XRP2, YRP2) | AT LEAST TWO | ARC SHAPE or ALONG CENTER LINE (BECOMING SEPARATE) | PINCH-OUT OPERATION |
| THREE-DIMENSIONAL PORTION (XRP2, YRP2) | AT LEAST THREE | DOWNWARD | SPREAD OPERATION |
| THREE-DIMENSIONAL PORTION (XRP2, YRP2) | AT LEAST THREE | UPWARD | PICK-UP OPERATION |

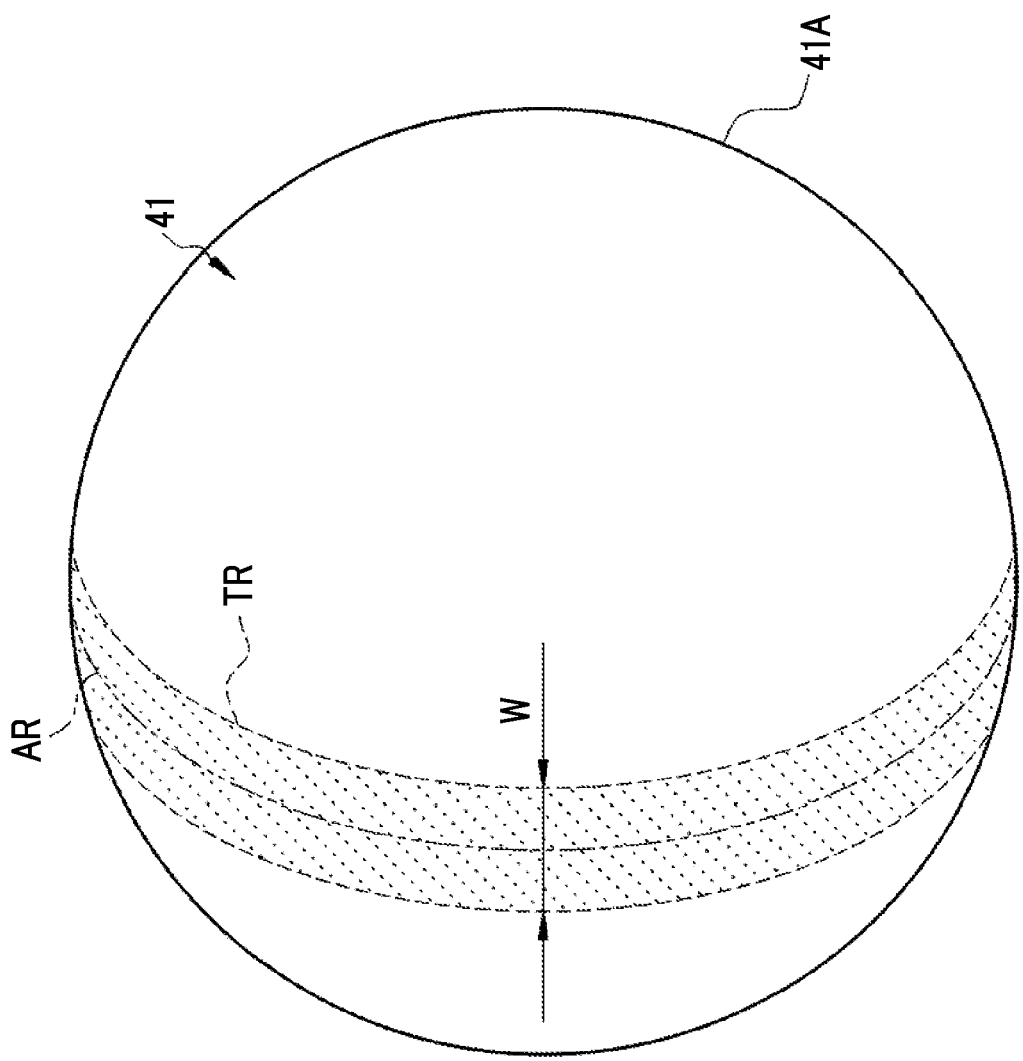

FIG. 25

| OPERATION-COMMAND CONVERSION INFORMATION 68 | PROCESSING STATUS | OPERATION COMMAND |
|---|---|---|
| GESTURE OPERATION | | |
| ROTARY SLIDE OPERATION | MENU BAR NON-DISPLAY | MENU BAR DISPLAY, OPERATION BUTTON SELECTION |
| STROKE OPERATION | MENU BAR NON-DISPLAY | MAP MOVING |
| SPREAD OPERATION | MENU BAR NON-DISPLAY | MAP ENLARGEMENT |
| PICK-UP OPERATION | MENU BAR NON-DISPLAY | MAP REDUCTION |
| PICK-UP OPERATION | MENU BAR DISPLAY | MENU BAR NON-DISPLAY |
| PICK-UP OPERATION | VOLUME CONTROL BAR DISPLAY | VOLUME CONTROL BAR NON-DISPLAY, VOLUME SETTING |
| PINCH-IN OPERATION | MENU BAR NON-DISPLAY | MAP REDUCTION |
| PINCH-OUT OPERATION | MENU BAR NON-DISPLAY | MAP ENLARGEMENT |
| PINCH-IN OPERATION | VOLUME CONTROL BAR DISPLAY | VOLUME INCREASE |
| PINCH-OUT OPERATION | VOLUME CONTROL BAR DISPLAY | VOLUME DECREASE |

FIG. 33

| OPERATION COMMAND CONVERSION INFORMATION — 95 | | |
|---|---|---|
| GESTURE OPERATION | PROCESSING STATUS | OPERATION COMMAND |
| PINCH-IN OPERATION | OPERATION LOCK PERFORMING | OPERATION LOCK RELEASE |
| PINCH-IN OPERATION | MENU BAR NON-DISPLAY | MAP REDUCTION |
| PINCH-OUT OPERATION | MENU BAR NON-DISPLAY | MAP ENLARGEMENT |
| PINCH-IN OPERATION | VOLUME CONTROL BAR DISPLAY | VOLUME INCREASE |
| PINCH-OUT OPERATION | VOLUME CONTROL BAR DISPLAY | VOLUME DECREASE |

FIG. 36

| OPERATION COMMAND CONVERSION INFORMATION ~100 | | |
|---|---|---|
| GESTURE OPERATION | PROCESSING STATUS | OPERATION COMMAND |
| FIRST PINCH-IN OPERATION | OPERATION LOCK PERFORMING | OPERATION LOCK RELEASE |
| FIRST PINCH-IN OPERATION | MENU BAR NON-DISPLAY | MAP REDUCTION (LARGE REDUCTION RATIO) |
| SECOND PINCH-IN OPERATION | MENU BAR NON-DISPLAY | MAP REDUCTION (SMALL REDUCTION RATIO) |
| PINCH-OUT OPERATION | MENU BAR NON-DISPLAY | MAP ENLARGEMENT |
| FIRST PINCH-IN OPERATION | VOLUME CONTROL BAR DISPLAY | VOLUME INCREASE (LARGE CHANGE AMOUNT) |
| SECOND PINCH-IN OPERATION | VOLUME CONTROL BAR DISPLAY | VOLUME INCREASE (SMALL CHANGE AMOUNT) |
| PINCH-OUT OPERATION | VOLUME CONTROL BAR DISPLAY | VOLUME DECREASE |

TOUCH TYPE OPERATION DEVICE, AND OPERATION METHOD AND OPERATION PROGRAM THEREOF

CROSS-REFERENCE TO RELATED APPLICATIONS

The present application claims priority under 35 U.S.C. § 119 to Japanese Patent Application No. 2017-093662, filed on May 10, 2017. Each of the above application(s) is hereby expressly incorporated by reference, in its entirety, into the present application.

BACKGROUND OF THE INVENTION

1. Field of the Invention

The present invention relates to a touch type operation device, and an operation method and a non-transitory computer readable recording medium storing an operation program thereof.

2. Description of the Related Art

A touch type operation device including a touch sensor is widely used. The touch sensor has an operation area in which a user brings the own finger into contact so as to perform a gesture operation. Currently, such a touch type operation device is mounted in various types of equipment. For example, in JP2014-215817A, a touch type operation device is applied as an input device to an in-vehicle display.

In JP2014-215817A, a touch sensor having an operation area of a spherical shape (hereinafter, spherical operation area) is exemplified. In addition, a pinch-in operation is exemplified as a gesture operation. The pinch-in operation refers to a gesture operation in which at least two fingers (for example, thumb and forefinger) are brought into contact with the operation area in a state of being separate from each other, and then the fingers are moved to cause the two fingers to become closer to each other by sliding one or both of the two fingers on the operation area.

The pinch-in operation is a gesture operation in which a distance between the two fingers is reduced. Therefore, in JP2014-215817A, as an operation command corresponding to the pinch-in operation, an operation command for reducing the display size of an image displayed in the in-vehicle display is assigned, which is easy to imagine intuitively from the pinch-in operation.

SUMMARY OF THE INVENTION

Here, in the pinch-in operation on a planar operation area, movement trajectories of the two fingers are along a straight line connecting the positions of the two fingers coming into contact with the planar operation area, in any place of the planar operation area.

However, in the pinch-in operation on the spherical operation area as in JP2014-215817A, the movement trajectories of the two fingers may not be along a straight line connecting the contact positions of the two fingers, in accordance with the place. Specifically, in a case where the spherical operation area is replaced with a planar operation area, the pinch-in operation may be erroneously recognized as a gesture operation corresponding to a stroke operation of moving the finger in a diagonal direction.

A case where an operation command of reducing the display size of an image is assigned to the pinch-in operation and an operation command of moving an image is assigned to the stroke operation is considered. In this case, as described above, if the pinch-in operation on the spherical operation area is recognized as a gesture operation corresponding to the stroke operation in the diagonal direction, an image moves even though a user performs the pinch-in operation with intention of only reducing the display size of the image. That is, processing unintended by a user is performed and usability is deteriorated.

An object of the present invention is to provide a touch type operation device, and an operation method and a non-transitory computer readable recording medium storing an operation program thereof in which it is possible to prevent an occurrence of a situation in which processing unintended by a user is performed by the pinch-in operation on the spherical operation area of a touch sensor, and to improve usability.

To solve the above problems, according to the present invention, touch type operation device includes a touch sensor that includes a spherical operation area as an operation area in which a user performs a gesture operation by bringing a finger into contact and detects the contact of the finger with the spherical operation area so as to output a detection signal, a first recognition unit that recognizes a contact position of the finger with the spherical operation area and a movement trajectory of the finger in the spherical operation area, based on the detection signal of the touch sensor, and a second recognition unit that recognizes the gesture operation performed on the spherical operation area, based on the contact position and the movement trajectory recognized by the first recognition unit, and recognizes the gesture operation of at least two fingers to be the same gesture operation as a pinch-in operation in which movement trajectories of the at least two fingers are straight lines in a case where the operation area is planar, in a case where the movement trajectories of the at least two fingers recognized by the first recognition unit are arc-shaped movement trajectories which are bulged outwardly in a case where the spherical operation area is viewed in a plan view and which correspond to the contact positions of the at least two fingers.

It is preferable that the spherical operation area includes an outer circumferential surface of a convex type three-dimensional portion having a spherical shape and the second recognition unit recognizes the gesture operation of the at least two fingers to be the same gesture operation as the pinch-in operation in a case where the contact positions of the at least two fingers are on a center line of the three-dimensional portion and the movement trajectories of the at least two fingers are along the center line, similar to the case of being the arc-shaped movement trajectory.

It is preferable that the spherical operation area includes an outer circumferential surface of a convex type three-dimensional portion having a spherical shape and, in a case where the contact positions of the at least two fingers have the same height, the arc-shaped movement trajectory is along an arc which passes through the contact positions of the at least two fingers, whose chord is the center line of the three-dimensional portion parallel to a line connecting the contact positions of the at least two fingers, in a case where the spherical operation area is viewed in a plan view.

It is preferable that the spherical operation area includes an outer circumferential surface of a first convex type three-dimensional portion having a spherical shape and an outer circumferential surface of a second convex type three-dimensional portion having a spherical shape which is disposed at a position including a vertex of the first three-dimensional portion, the second convex type three-dimensional portion has a size smaller than a size of the first three-dimensional portion, and the arc-shaped movement trajectory is along a lower circumference of the second three-dimensional portion, which is a boundary between the first three-dimensional portion and the second three-dimensional portion.

It is preferable that the second recognition unit determines that the movement trajectory recognized by the first recognition unit coincides with the arc-shaped movement trajectory, in a case where an error between the movement trajectory recognized by the first recognition unit and the arc-shaped movement trajectory is within an allowable range. It is preferable that the allowable range is set based on an average value of widths of the fingers.

It is preferable that a first electrode and a second electrode for outputting the detection signal are arranged in the operation area in a matrix, and the first recognition unit recognizes an intersection point between the first electrode and the second electrode to be the contact position, based on the detection signal of the first electrode and the second electrode. In this case, it is preferable that the first recognition unit recognizes an intersection point at which the detection signal of the first electrode and the second electrode has an external value among a plurality of intersection points adjacent to the first electrode and the second electrode, to be the contact position. It is preferable that the first electrode and the second electrode are provided along the arc-shaped movement trajectory.

It is preferable that an image displayed in a display is reduced in accordance with the pinch-in operation. It is preferable that an operation lock of the touch sensor is released in accordance with the pinch-in operation.

It is preferable that a function performed in a case where the movement trajectory recognized by the first recognition unit is a movement trajectory in which all of the at least two fingers moves is different from a function performed in a case where the movement trajectory recognized by the first recognition unit is a movement trajectory in which one of the at least two fingers does not move and the other moves.

It is preferable that the spherical operation area includes an outer circumferential surface of a convex type three-dimensional portion having a hemispherical shape. It is preferable that the touch type operation device is mounted in a vehicle.

According to the present invention, an operation method of a touch type operation device is an operation method of a touch type operation device including a touch sensor that includes a spherical operation area as an operation area in which a user performs a gesture operation by bringing a finger into contact and detects the contact of the finger with the spherical operation area so as to output a detection signal. The operation method includes a first recognition step of recognizing a contact position of the finger with the spherical operation area and a movement trajectory of the finger in the spherical operation area, based on the detection signal of the touch sensor, and a second recognition step of recognizing the gesture operation performed on the spherical operation area based on the contact position and the movement trajectory recognized in the first recognition step, and of recognizing the gesture operation of at least two fingers to be the same gesture operation as a pinch-in operation in which the movement trajectories of the at least two fingers are straight lines in a case where the operation area is planar, in a case where the movement trajectories of the at least two fingers recognized in the first recognition step are arc-shaped movement trajectories which are bulged outwardly in a case where the spherical operation area is viewed in a plan view and which correspond to the contact positions of the at least two fingers.

According to the present invention, a non-transitory computer readable recording medium storing an operation program of a touch type operation device is an operation program of a touch type operation device including a touch sensor that includes a spherical operation area as an operation area in which a user performs a gesture operation by bringing a finger into contact and detects the contact of the finger with the spherical operation area so as to output a detection signal. The operation program causes a computer to perform a first recognition function of recognizing a contact position of the finger with the spherical operation area and a movement trajectory of the finger in the spherical operation area, based on the detection signal of the touch sensor, and a second recognition function of recognizing the gesture operation performed on the spherical operation area based on the contact position and the movement trajectory recognized by the first recognition function, and of recognizing the gesture operation of at least two fingers to be the same gesture operation as a pinch-in operation in which the movement trajectories of the at least two fingers are straight lines in a case where the operation area is planar, in a case where the movement trajectories of the at least two fingers recognized by the first recognition function are arc-shaped movement trajectories which are bulged outwardly in a case where the spherical operation area is viewed in a plan view and which correspond to the contact positions of the at least two fingers.

According to the present invention, a gesture operation of at least two fingers is recognized to be the same gesture operation as a pinch-in operation in a planar operation area, in a case where the movement trajectories of the at least two fingers in a spherical operation area of a touch sensor are arc-shaped movement trajectories which are bulged outwardly in a case where the spherical operation area is viewed in a plan view. Thus, it is possible to provide a touch type operation device, and an operation method and a non-transitory computer readable recording medium storing an operation program thereof in which it is possible to prevent an occurrence of a situation in which processing unintended by a user is performed by the pinch-in operation on the spherical operation area of the touch sensor, and to improve usability.

BRIEF DESCRIPTION OF THE DRAWINGS

FIGS. 9A to 9D are diagrams illustrating a manufacturing method of the touch pad.

FIGS. 13A and 13B are diagrams illustrating a spread operation and a pick-up operation.

FIG. 20 is a diagram illustrating operation recognition information.

FIG. 24 is a diagram illustrating an allowable range set for an arc-shaped movement trajectory.

FIG. 25 is a diagram illustrating operation-command conversion information.

FIG. 33 is a diagram illustrating operation-command conversion information according to a third embodiment.

FIG. 36 is a diagram illustrating operation-command conversion information according to a fourth embodiment.

DESCRIPTION OF THE PREFERRED EMBODIMENTS

First Embodiment

Figure 1:
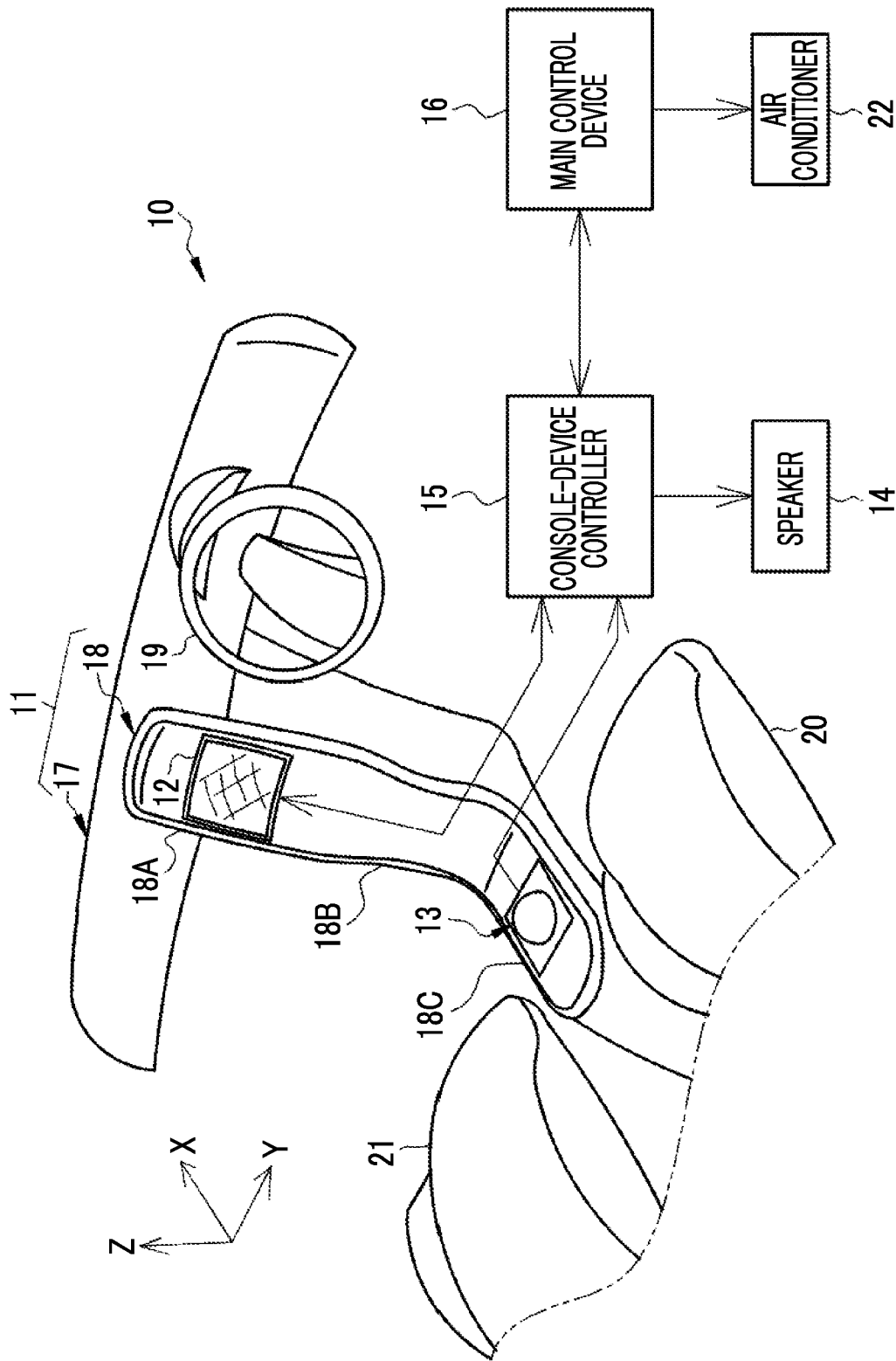
FIG. 1 is a schematic diagram illustrating an overall configuration of a console system of an automobile.

In FIG. 1, a console system 10 is provided in an instrument panel 11 of an automobile. The console system 10 is a system for operating various in-vehicle APs 67 (see FIG. 17) such as a car navigation application program (abbreviated as "AP" below) of guiding a traveling route of an automobile, a car air-conditioner AP of controlling air conditioning of the automobile, and a car audio system AP of reproducing music or a video. The console system 10 includes a touch panel display (simply referred to as a touch panel below) 12, a touch pad 13, a speaker 14, a console-device controller 15, and a main control device 16.

The instrument panel 11 includes a dashboard 17 and a center console 18. The dashboard 17 extends in a direction of a Y-axis (horizontal axis parallel to a width direction of the automobile) over a passenger seat 21 side from a driver's seat 20 side on which a steering wheel 19 is disposed. The center console 18 is configured by an upper portion 18A, a central portion 18B, and a lower portion 18C which are disposed between the driver's seat 20 and the passenger seat 21.

The upper portion 18A is connected to the central portion of the dashboard 17. The central portion 18B has a smooth curved surface which connects the upper portion 18A and the lower portion 18C and does not have a step. The upper portion 18A and the central portion 18B are slightly inclined toward the front of the automobile from a Z-axis as a vertical axis. The lower portion 18C is bent from the central portion 18B at a substantially right angle and is substantially parallel to an X-axis (horizontal axis parallel to a length direction of the automobile) orthogonal to the Y-axis and the Z-axis. The touch panel 12 is provided at the upper portion 18A and the touch pad 13 is provided at the lower portion 18C.

As well known, the touch panel 12 is one kind of a touch sensor. The touch panel 12 includes a thin planar display such as a liquid crystal display or an organic electroluminescence (EL) display and a touch pad which is disposed on the display and is also thin and planar. The touch panel 12 displays various screens in the display and recognizes a gesture operation by a contact of a finger F (see FIG. 7, for example) of a user with the various screens. In the embodiment, the user is a driver of the automobile sitting on the driver's seat 20.

The touch pad 13 does not have a display function which is different from that of the touch panel 12. The touch pad 13 is one kind of the touch sensor and recognizes a gesture operation, similar to the touch panel 12. Although details of the touch pad 13 will be described later, the touch pad 13 does not have a planar two-dimensional shape such as the touch panel 12, and but has a three-dimensional shape in which a three-dimensional portion 41 (see FIG. 6).

The speaker 14 is mounted in the dashboard 17 or a door (not illustrated), for example. The speaker 14 outputs various kinds of sound such as guide sound of the car navigation AP, reproduced sound of the car audio system AP, notification sound for a gesture operation performed through the touch panel 12 and the touch pad 13. The notification sound for the gesture operation includes a sound effect indicating that the gesture operation has been recognized or details of a function executed in the in-vehicle AP 67 in accordance with the gesture operation, for example.

The console-device controller 15 controls console devices such as the touch panel 12, the touch pad 13, and the speaker 14. The main control device 16 is connected to the console-device controller 15. The main control device 16 collectively controls operations of the units in the automobile, which include the console-device controller 15.

Figure 2:
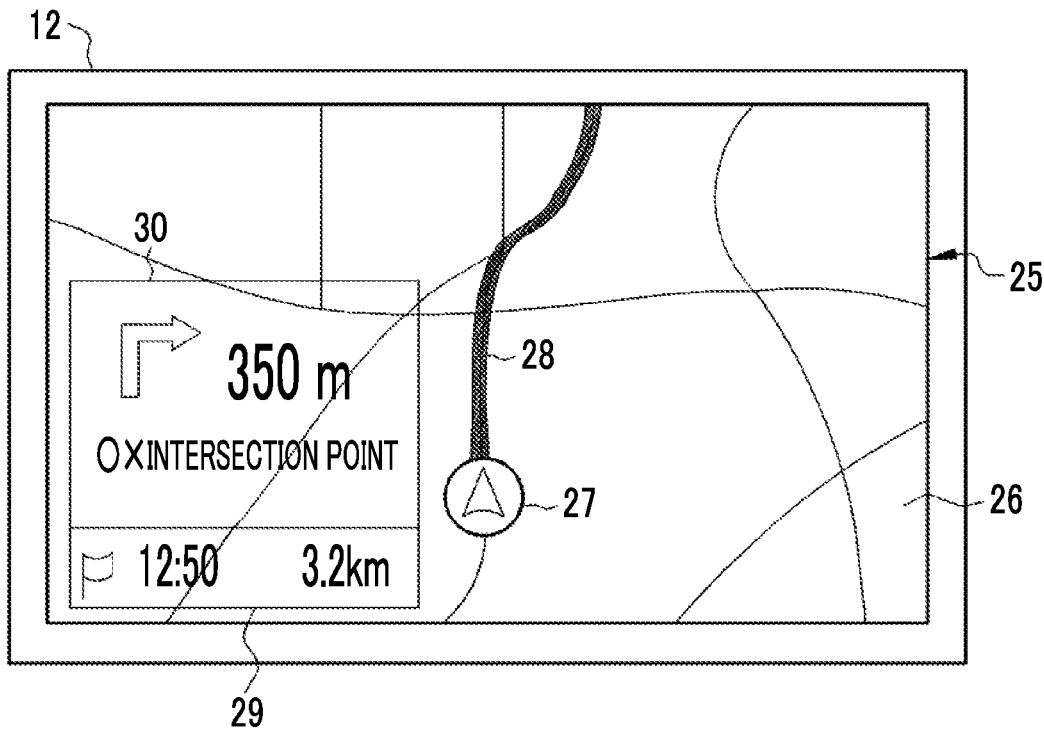
FIG. 2 is a diagram illustrating a map display screen.

As well known, the car navigation AP displays the current location of the automobile, which has been determined by a global positioning system (GPS, not illustrated), on a map through the touch panel 12 or guides a traveling route to a destination which has been set (see FIG. 2, for example). The car navigation AP can provide traffic jam information, vacant parking lot information, peripheral shop information and the like.

The car air-conditioner AP starts an air conditioner 22 including a compressor or a heater. The car air-conditioner AP supplies a cold and warm air into a vehicle from an air outlet (not illustrated) formed in the dashboard 17 or the like, so as to control the temperature in the vehicle.

The car audio system AP reproduces television broadcasts and radio broadcasts through the touch panel 12 and the speaker 14 or reproduces music or a video recorded on a recording medium such as a compact disc (CD) or a digital versatile disc (DVD). The console system 10 includes a terminal (auxiliary (AUX) terminal (not illustrated)) connecting an external device such as a portable music player. The car audio system AP can also reproduce music stored in an external device through the speaker 14.

FIGS. 2 to 5 illustrate a map display screen 25 displayed in the touch panel 12. A map 26 by the car navigation AP is displayed on the map display screen 25. In a default state, the map 26 showing the surrounding area in a setting range using the current location of the automobile, which has been determined by the GPS, as the substantial center is displayed (referred to as current location display below). The map 26 corresponds to an image displayed in the display.

Figure 3:
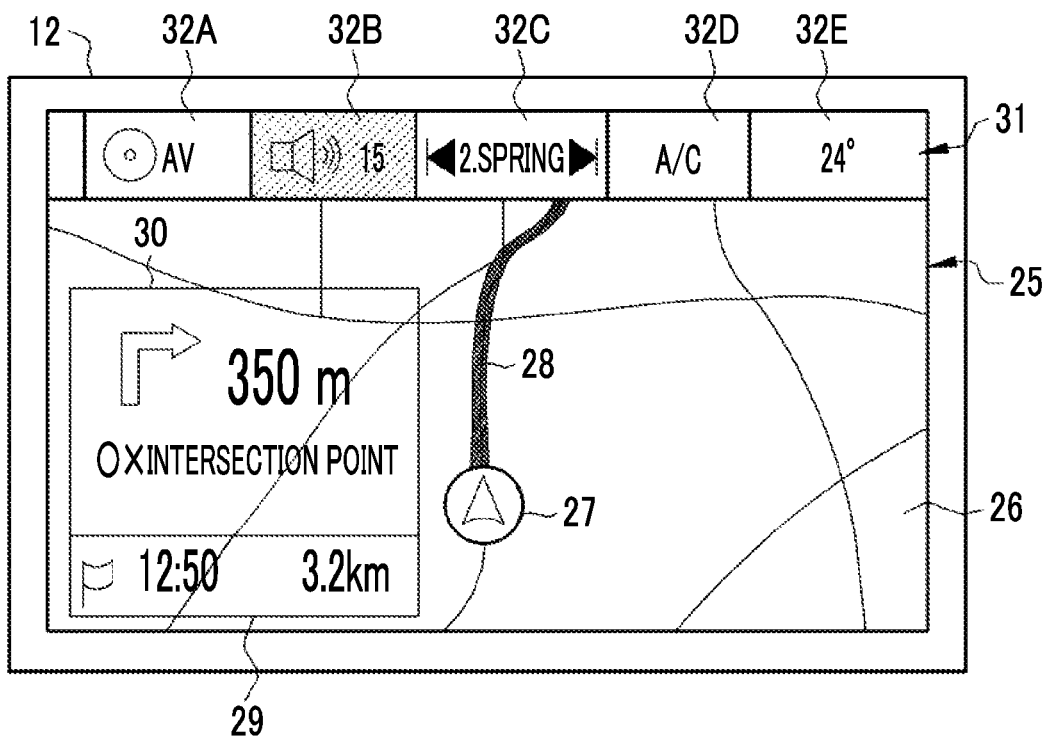
FIG. 3 is a diagram illustrating the map display screen on which a menu bar is displayed.
Figure 4:
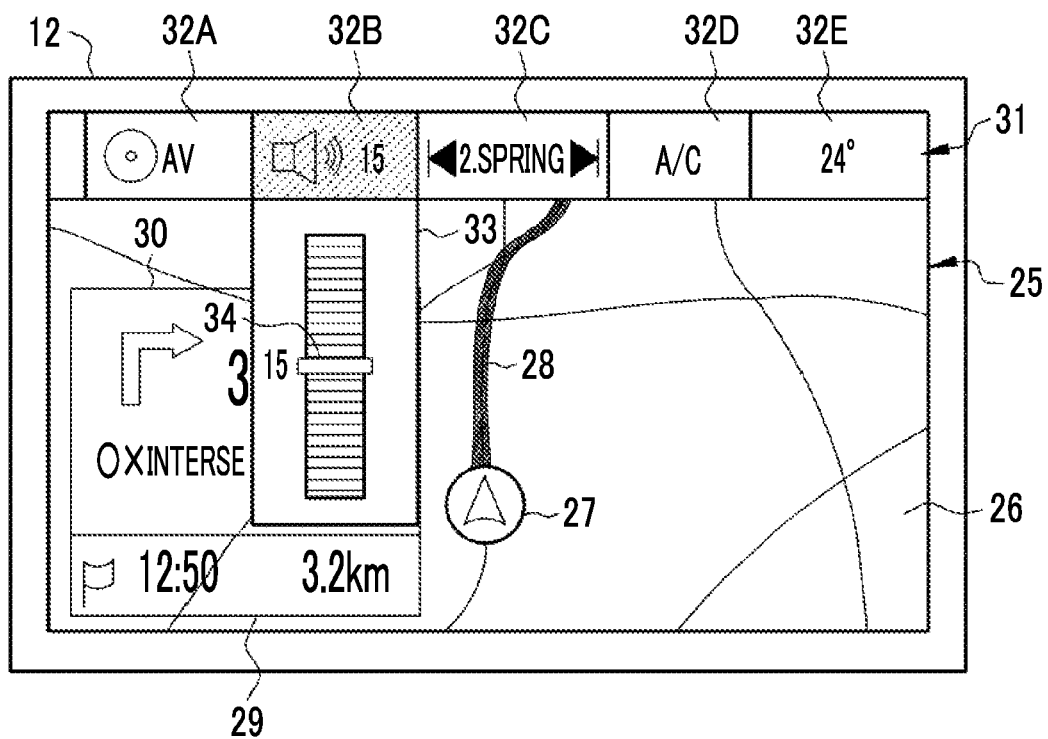
FIG. 4 is a diagram illustrating a form in which the volume of a car audio system is controlled.

As illustrated in the map display screen 25 in FIGS. 2 to 4, in a case where the current location of the automobile is provided in the surrounding area shown in the map 26, a current location mark 27 indicating the current location of the automobile is displayed. In a case where a destination has been set, for example, a traveling route 28 to the destination, first navigation information 29 indicating an estimated arrival time of the destination and a distance to the destination, and second navigation information 30 indicating the next intersection point for turning right or left are displayed.

In FIGS. 3 and 4, a menu bar 31 is provided and displayed in the upper portion of the touch panel 12. The menu bar 31 has an elongated stripe shape. In the menu bar, a plurality of operation buttons 32A, 32B, 32C, 32D, and 32E corresponding to a plurality of menu items are arranged in a transverse direction.

The menu items correspond to various functions performed by the in-vehicle APs 67 of the car navigation AP, the car air-conditioner AP, and the car audio system AP, respectively. In FIGS. 3 and 4, menu items corresponding to functions of the car audio system AP are assigned to the operation buttons 32A to 32C and menu items corresponding to functions of the car air-conditioner AP are assigned to the operation buttons 32D and 32E, respectively. More specifically, an audio-visual (AV) menu is assigned to the operation button 32A, volume control is assigned to the operation button 32B, and music selection is assigned to the operation button 32C. An air conditioner (A/C) menu is assigned to the operation button 32D and temperature control is assigned to the operation button 32E. In FIGS. 3 and 4, an operation button to which a menu item corresponding to the function of the car navigation AP is assigned is not illustrated. However, this operation button is also provided in the menu bar 31. In the following descriptions, a plurality of operation buttons may be collectively described as the operation button 32 in a case where distinguishment is not particularly required.

Illustrations or letters indicating the menu item are displayed in the corresponding operation button 32. For example, an illustrating imitating the speaker 14 and the number indicating a volume value which is currently set are displayed in the operation button 32B for volume control. The operation button 32 (operation button 32B in FIGS. 3 and 4) which is currently selected among the operation buttons 32 is subjected to focus display so as to be allowed to be distinguished from other operation buttons 32, as shown with hatching. For focus display, display techniques as follows are provided: a technique in which the operation button 32 being selected is displayed to have a color different from colors of other operation buttons 32 (for example, the operation button 32 being selected is displayed to have a red color and other operation buttons 32 are displayed to have a gray color (gray out)); a technique in which only the operation button 32 being selected is surrounded by a frame; and a technique in which the operation button 32 being selected is displayed to have an increased display size and to stand out.

The operation button 32A is a button for calling an AV menu screen (not illustrated) which allows all functions performed by the car audio system AP to be operated. In a case where the operation button 32A is selected, the AV menu screen is displayed in the touch panel 12.

The operation button 32B is a button for controlling the volume. The operation button 32C is a button for bringing a state where music is reproduced, back in the car audio system AP, that is, for performing music selection.

A volume control function and a music selection function which can be operated by the operation button 32B and the operation button 32C are functions having relatively high use frequency among the various functions performed by the car audio system AP. The volume control function and the music selection function can also be operated through the AV menu screen. However, this case is slightly troublesome because it is necessary that the operation button 32A is selected so as to call the AV menu screen and then an operation of volume control or music selection is performed. Therefore, the operation button 32B and the operation button 32C are shortcut buttons provided to be dedicated in order to access the volume control function and the music selection function (having high use frequency) without passing through the AV menu screen.

The operation button 32D is a button for calling an A/C menu screen (not illustrated) which allows all functions performed by the car air-conditioner AP to be operated. In a case where the operation button 32D is selected, the A/C menu screen is displayed in the touch panel 12.

The operation button 32E is a button for controlling an aimed temperature of the air conditioner 22. The temperature control function is a function having relatively high use frequency among the various functions performed by the car air-conditioner AP, similar to the volume control function and the like. Therefore, similar to the operation button 32B and the like, the operation button 32E is a shortcut button for directly accessing the temperature control function having high use frequency. Although not illustrated, a button for controlling the air volume of a cold or hot air and a button for controlling an air direction of the cold or hot air are provided as the operation button dedicated for the car air-conditioner, in addition to the operation button 32E.

Although not illustrated, an operation button 32 for calling a navigation menu screen (not illustrated) which allows all functions performed by the car navigation AP to be operated is provided in the menu bar 31. An operation button 32 for calling a main menu screen (not illustrated) which allows all functions performed by the in-vehicle APs 67 (car navigation AP, car air-conditioner AP, and car audio system AP) to be operated is also provided. A viewpoint switching function of the map 26 such as a plan view and a bird-eye view, a destination searching function using a name, a telephone number, an address, and a facility type (for example, a gas station, a convenience store, and a hotel), and a facility searching function around the current location are provided as functions performed by the car navigation AP.

In FIG. 4, in a case where, for example, the operation button 32B is selected among the operation buttons 32 in the menu bar 31, a volume control bar 33 is displayed under the operation button 32B in a pull-down manner. The volume is controlled by moving a cursor 34 of the volume control bar 33 to a desired position. Basically, the above descriptions are similarly applied to a case where the operation button 32E for temperature control is selected.

Figure 5:
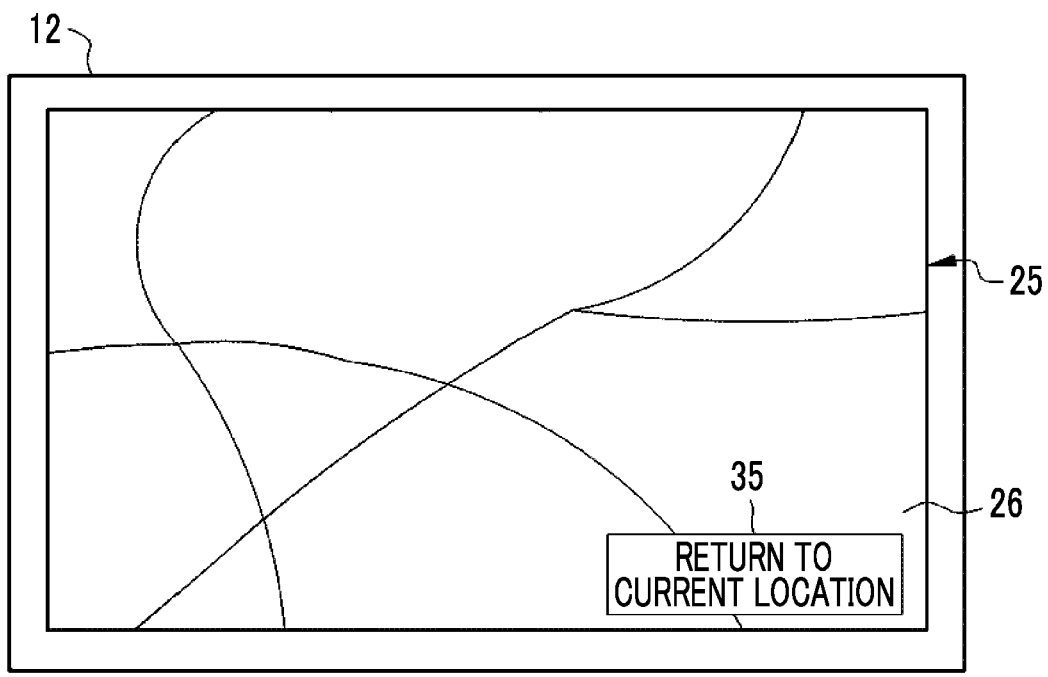
FIG. 5 is a diagram illustrating a state where a map is moved from a state where the current location is displayed.

FIG. 5 illustrates a state where the map 26 is moved from a state of current location display illustrated in FIGS. 2 to 4. In this case, an operation button 35 for bringing the map 26 back to the state of the current location display is displayed on the map display screen 25. Letters indicating the function of bringing the map 26 back to the state of the current location display are displayed in the operation button 35. In a case where the operation button 35 is selected, the map 26 is brought back to the state of the current location display. In a state (illustrated in FIG. 5) where the map 26 is moved from the state of the current location display, the first navigation information 29 and the second navigation information 30 are removed.

All of operations such as moving of the map 26 on the map display screen 25, switching between display and non-display of the menu bar 31, selecting and selection confirming operation of the various operation buttons such as the operation buttons 32 and the operation button 35, selecting and setting operation of the various functions through the AV menu screen, the A/C menu screen, the navigation menu screen and the main menu screen, and the like can be performed through the touch panel 12. Operations similar to those in the touch panel 12 can also be performed by the touch pad 13.

Figure 6:
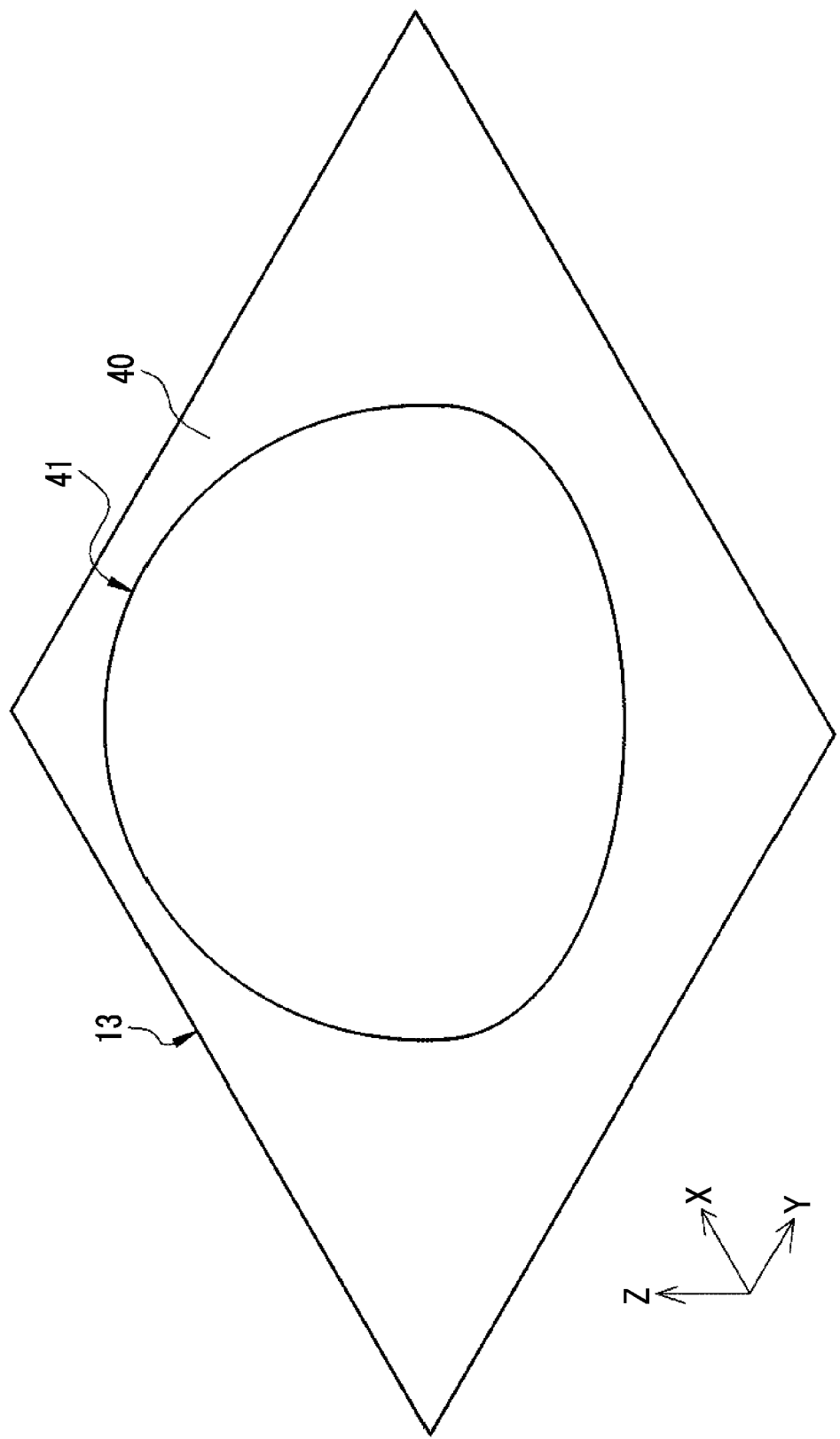
FIG. 6 is a perspective view illustrating an external appearance of a touch pad having a convex type three-dimensional portion of a hemispherical shape.

As illustrated in FIG. 6, the touch pad 13 has a three-dimensional shape which is different from the two-dimensional shape (as in the touch panel 12) having the entirety of the operation area being planar. The three-dimensional shape is obtained by combining a flat portion 40 and a convex type three-dimensional portion 41 which protrudes from the flat portion 40. The flat portion 40 is rectangular, more specifically, has a square shape. The three-dimensional portion 41 is spherical, more specifically, has a hemispherical shape obtained by dividing a sphere in half. The three-dimensional portion 41 is provided at the substantially center of the flat portion 40. The entirety of the outer circumferential surface of the flat portion 40 and the three-dimensional portion 41 is an operation area in which a user brings the finger F into contact so as to perform a gesture operation. In particular, the outer circumferential surface of the three-dimensional portion 41 constitutes the spherical operation area according to the present invention. The hemispherical shape is not limited to a shape obtained by completely dividing a sphere in half. For example, the hemispherical shape includes a shape corresponding to ⅖ or ⅘ when a sphere is divided into five equal parts.

Figure 7:
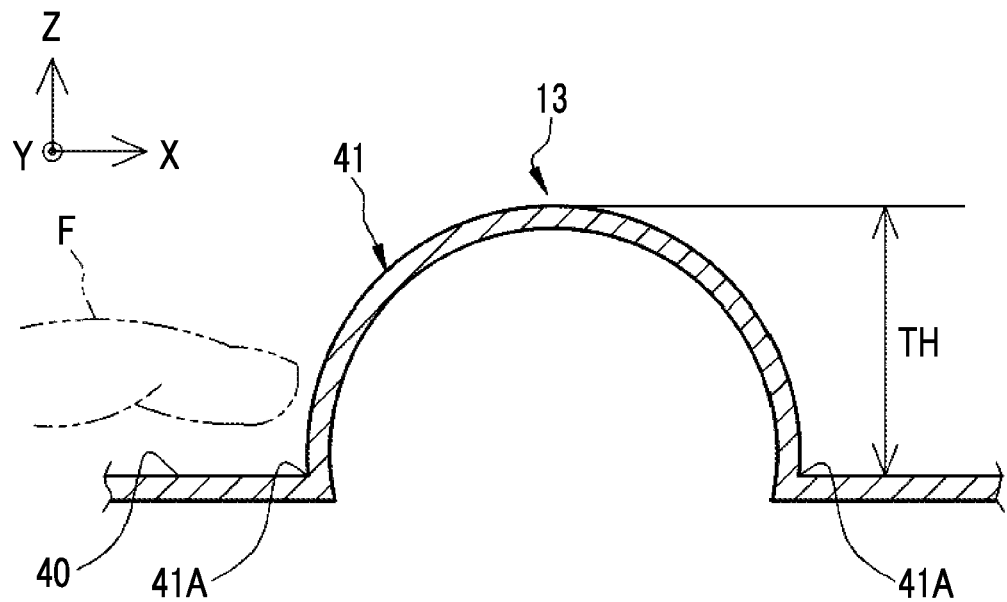
FIG. 7 is a sectional view illustrating the touch pad.
Figure 8:
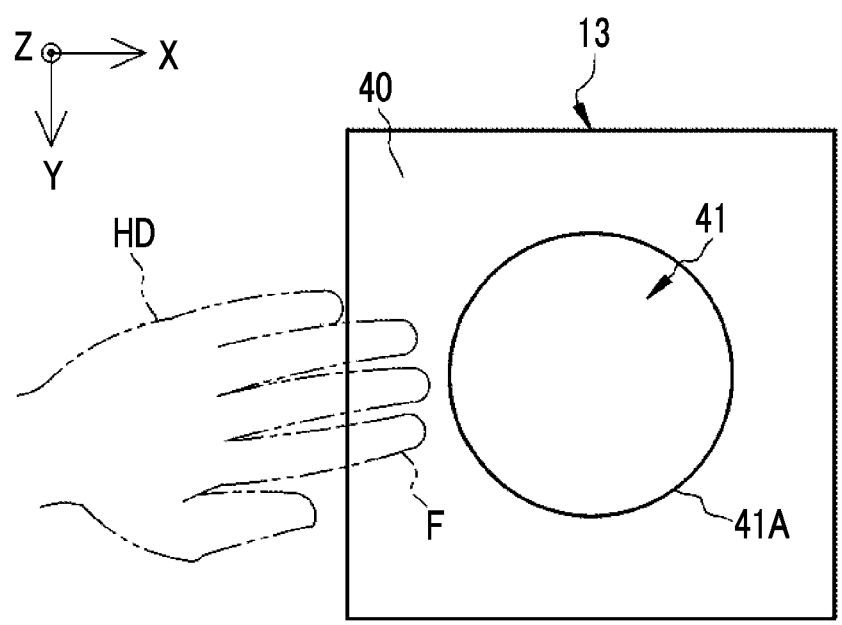
FIG. 8 is a plan view illustrating the touch pad.

As illustrated in FIGS. 7 and 8, a lower circumference 41A of the three-dimensional portion 41, which is a boundary between the flat portion 40 and the three-dimensional portion 41, is formed between the flat portion 40 and the three-dimensional portion 41, and is defined by a step TH corresponding to the height of the three-dimensional portion 41. The step TH is formed between the flat portion 40 and the three-dimensional portion 41. The step TH may have a height as long as can perceive the boundary between the flat portion 40 and the three-dimensional portion 41 by touching with a hand. Specifically, it is preferable that the step TH has a height which is equal to or greater than the thickness (about 10 mm) of the finger F.

The touch pad 13 uses a projection type electrostatic capacitance method which is capable of detecting multiple points simultaneously with detecting the contact positions of a plurality of fingers F in the operation area. The touch pad 13 can be manufactured by a method disclosed in JP2016-213435A, for example.

Although details of the manufacturing method of the touch pad 13 are as disclosed in JP2016-213435A, the outline is illustrated in FIGS. 9A to 9D. Firstly, in FIG. 9A, plating layers 46A and 46B are formed on the entirety of the front surface and the back surface of a planar substrate 45 by a printing method such as screen printing (FIG. 9A illustrates only portions of the plating layers 46A and 46B). The plating layers 46A and 46B are undercoats of a first electrode 47A and a second electrode 47B (see FIG. 9D) for detecting the contact position of a finger F.

The plating layer 46A on the front surface is formed to have a stripe shape in an X-axis direction. The plating layer 46B on the back surface is formed to have a stripe shape in a Y-axis direction. Thus, the plating layers 46A and 46B are arranged in a matrix, on the back surface and the front surface of the substrate 45.

The substrate 45 is made of a transparent thermoplastic resin such as polyethylene terephthalate and polycarbonate. The plating layers 46A and 46B are made of compounds or compositions having a functional group or the like that interacts with a plating catalyst or the like. Examples of the functional group include a carboxylic acid group and a cyano group.

After the plating layers 46A and 46B are formed, as illustrated in FIG. 9B, a substantial center of the substrate 45 is projected to have a hemispherical shape by using a thermal deformation method such as vacuum forming, blow molding, or hot press molding. Thereby, the three-dimensional portion 41 is formed. Thus, the flat portion 40 and the three-dimensional portion 41, and the lower circumference 41A of the three-dimensional portion 41, which is a boundary between the flat portion 40 and the three-dimensional portion 41 are defined.

As illustrated in FIG. 9C, a metal plating treatment in which the deformed substrate 45 is immersed in a plating solution of copper or the like is performed. With the metal plating treatment, the first electrode 47A and the second electrode 47B formed with a semitransparent metal thin film (metal layer) of copper or the like are formed on the plating layers 46A and 46B, as illustrated in FIG. 9D. Various kinds of processing (for example, forming a surface protective layer) are performed on the substrate 45 illustrated in FIG. 9D and various electronic components such as a signal processing integrated circuit (IC) are connected. Thus, manufacturing of the touch pad 13 is completed.

Here, generally, the metal layer has small elongation at break. Therefore, if the metal layer is provided on the substrate 45 and then the substrate 45 is deformed to have a three-dimensional shape, the metal layer fails to follow the elongation of the substrate 45 and breaks in many cases. Even though the metal layer does not break, the metal layer extends with following the substrate 45 when being deformed. Thus, the film thickness of the metal layer is reduced, and the resistance value of the metal layer is increased as much as the film thickness of the metal layer is reduced.

On the contrary, in the manufacturing method illustrated in FIGS. 9A to 9D, the substrate 45 on which the plating layers 46A and 46B have been formed is deformed to have a desired three-dimensional shape, and then the metal plating treatment is performed so as to form a metal layer. Thus, breaking of the metal layer is prevented. In addition, the metal layer does not extend with following deformation of the substrate 45 and the resistance value of the metal layer is not increased. Therefore, the manufacturing method illustrated in FIGS. 9A to 9D is effective as the manufacturing method of the touch pad 13 having a spherical operation area.

A small voltage is applied between the electrodes 47A and 47B arranged in a matrix. If the finger F of a user comes into contact with the operation area of the touch pad 13, electrostatic capacity at a contact position changes and a change of the voltage depending on the change of the electrostatic capacity is output as a detection signal. Any of a plurality of intersection points IP of the electrodes 47A and 47B is recognized as the contact position of the finger F, based on the detection signal. For convenience of descriptions, in FIG. 9D, the electrodes 47A and 47B are illustrated to have a relatively large width. However, in practice, the width of the electrodes 47A and 47B is very small. For example, if a case where the substrate 45 is used as a touch panel including a display function is considered, the electrodes 47A and 47B have a fine width such that the aperture ratio of a display pixel in the touch panel is about 90%.

Figure 10:
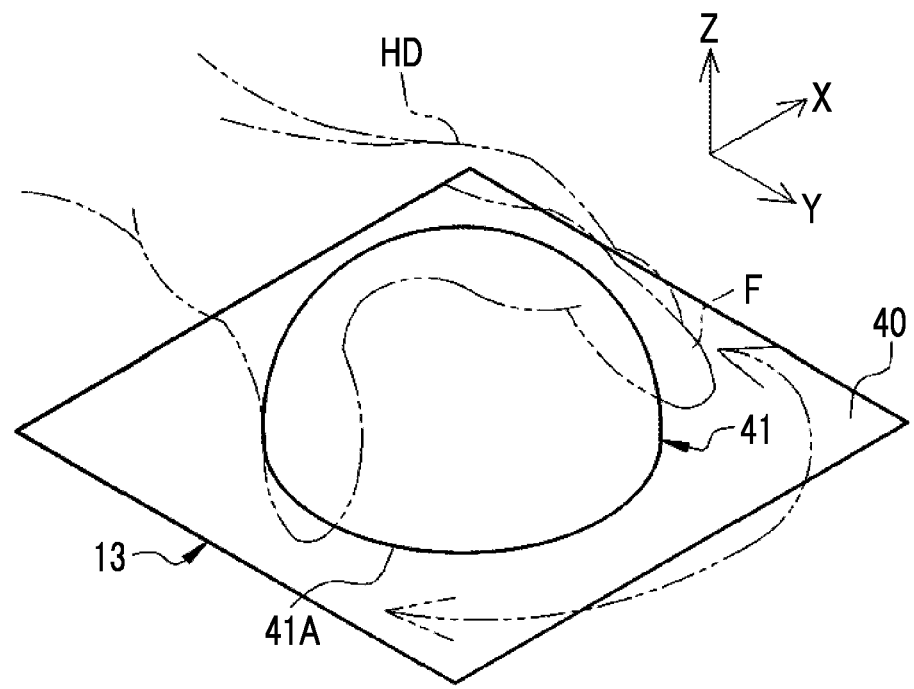
FIG. 10 is a diagram illustrating a rotary slide operation.

FIGS. 10 to 14B illustrate the representative gesture operations on the touch pad 13. FIG. 10 illustrates a gesture operation in which at least two fingers F including a thumb and a forefinger are brought into contact with the lower circumference 41A of the three-dimensional portion 41 in a grasping manner from above, and, in this state, the fingers F are rotate and moved right and left along the lower circumference 41A. The gesture operation is referred to as a rotary slide operation below. In order to allow the rotary slide operation, the three-dimensional portion 41 is formed to have a size (for example, the step TH is equal to or smaller than about 90 mm) as large as can be completely wrapped with the hand HD.

In a case where the rotary slide operation is performed in a state where the menu bar 31 illustrated in FIG. 2 is not displayed, as illustrated in FIG. 3, the menu bar 31 is provided and displayed at the upper portion of the touch panel 12 and simultaneously, focus display of the operation button 32 moves. Thus, selection of the operation button 32 (menu item) is allowed.

Figure 11:
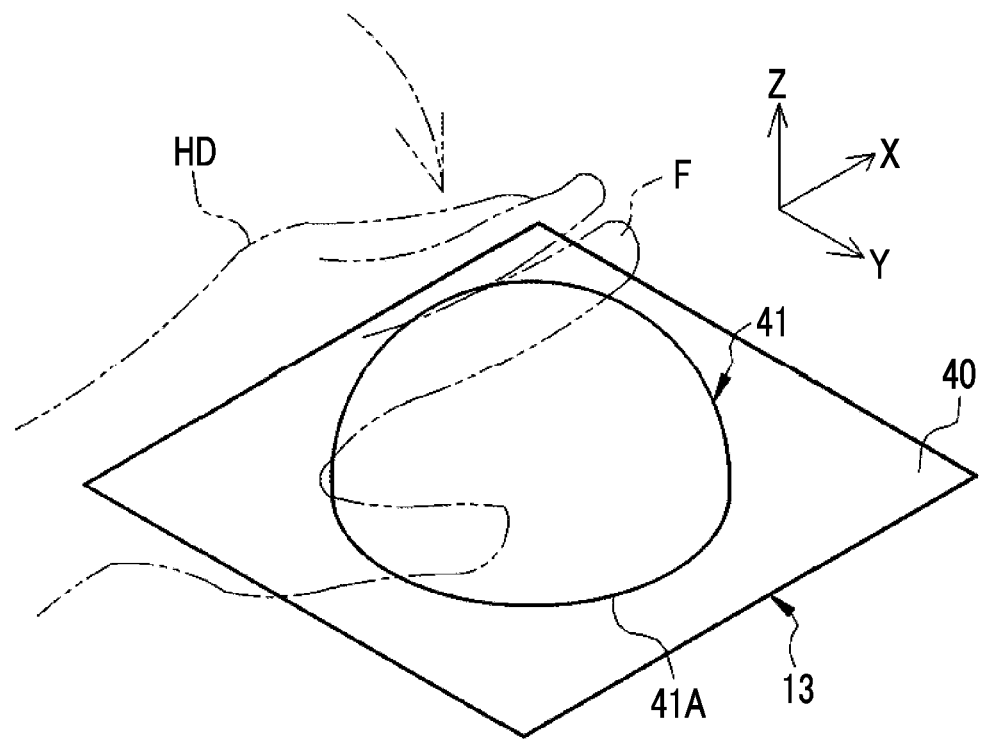
FIG. 11 is a diagram illustrating a tap operation.

FIG. 11 illustrates a gesture operation of hitting the surface of the three-dimensional portion 41 of the touch pad 13 with the finger F. The gesture operation is referred to as a tap operation below.

There are two kinds of tap operations, a single tap operation in which the surface of the three-dimensional portion 41 is hit once and a double tap operation in which the three-dimensional portion 41 is consecutively hit twice. In a case where the single tap operation is performed in a state where the menu bar 31 illustrated in FIG. 3 is displayed, it is determined that the operation button 32 which is focus-displayed at this time is selected. In a case where the double tap operation is performed in a state where the map 26 is moved from the state of the current location display and thus the operation button 35 is displayed as illustrated in FIG. 5, the operation button 35 is selected and the map 26 is brought back to the state of the current location display.

Figure 12A:
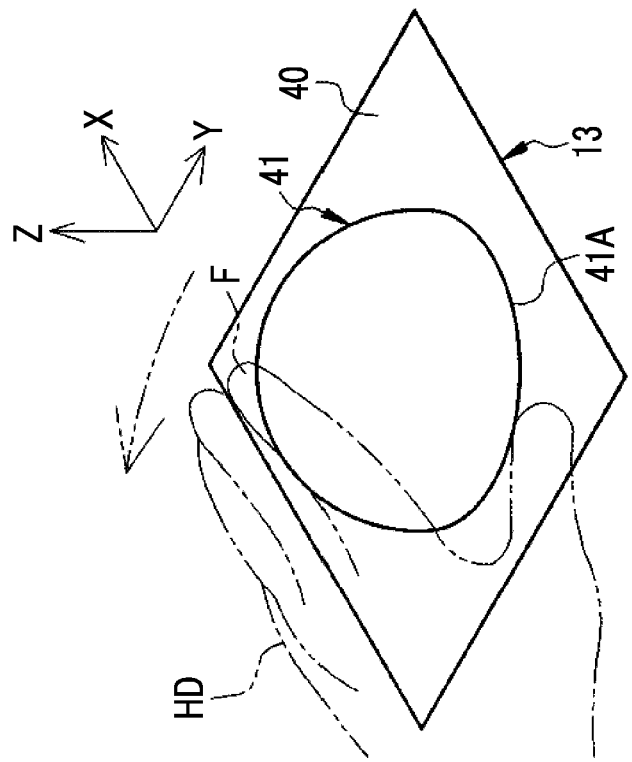
FIGS. 12A and 12B are diagrams illustrating a stroke operation.
Figure 12B:
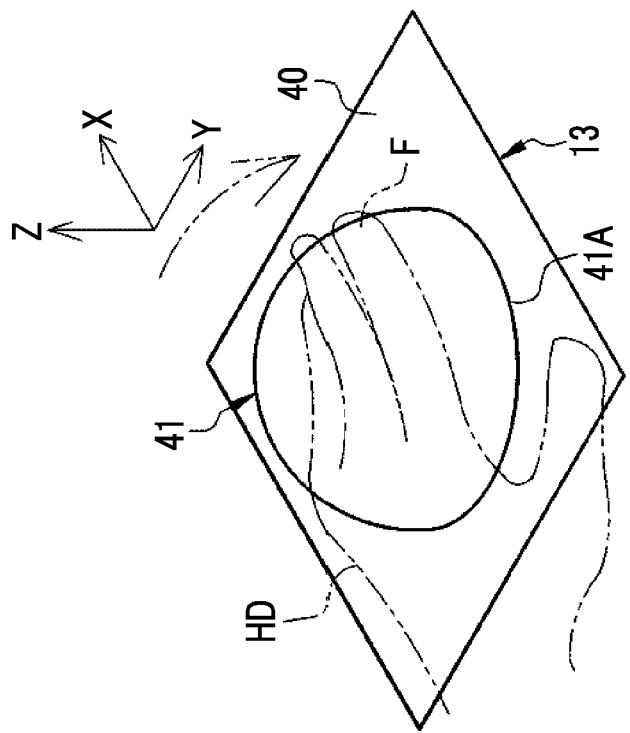

FIGS. 12A and 12B illustrate a gesture operation in which at least one finger F such as the forefinger is brought into contact with any position on the outer circumferential surface of the three-dimensional portion 41, and, in this state, the hand HD is swung to the front and back and left and right (FIGS. 12A and 12B illustrates only a case of the left and right) so as to stroke the outer circumferential surface of the three-dimensional portion 41. FIG. 12A illustrates a state where the hand HD is swung to the left. FIG. 12B illustrates a state where the hand HD is swung to the right. The gesture operation is referred to as a stroke operation below.

In a case where the stroke operation is performed in a state where the map display screen 25 is displayed, the map 26 is moved.

FIG. 13A illustrates a case where the upper portion of the three-dimensional portion 41 is gripped by at least three fingers F including the thumb, the forefinger, and the middle finger of the hand HD and the fingers F are moved downward. On the contrary, FIG. 13B illustrates a case where at least three fingers F including the thumb, the forefinger, and the middle finger are brought into contact with the lower portion of the three-dimensional portion 41 and the fingers F are moved upward like as picking up the outer circumferential surface of the three-dimensional portion 41. With FIGS. 13A and 13B, the hand HD after the fingers F are moved is illustrated, but the hand HD before the fingers F are moved is not illustrated. However, a case before the fingers F are moved in FIG. 13A is just a state illustrated in FIG. 13B, and a case before the fingers F are moved in FIG. 13B is just a state illustrated in FIG. 13A. The gesture operation in FIG. 13A is referred to as a spread operation below. The gesture operation in FIG. 13B is referred to as a pick-up operation below.

In a case where the spread operation is performed in a state where the map display screen 25 is displayed, the display range of the map 26 is expanded. In a case where the pick-up operation is performed the display range of the map 26 is reduced.

The pick-up operation is performed in a case where an instruction to end various kinds of display or various settings is performed. For example, in a case where the pick-up operation is performed in a state where the menu bar 31 is displayed as illustrated in FIG. 3, display of the menu bar 31 is erased from the touch panel 12. In a case where the pick-up operation is performed in a state where the volume control bar 33 is displayed as illustrated in FIG. 4, display of the volume control bar 33 is erased. At this time, the volume selected by the cursor 34 is set.

Figure 14B:
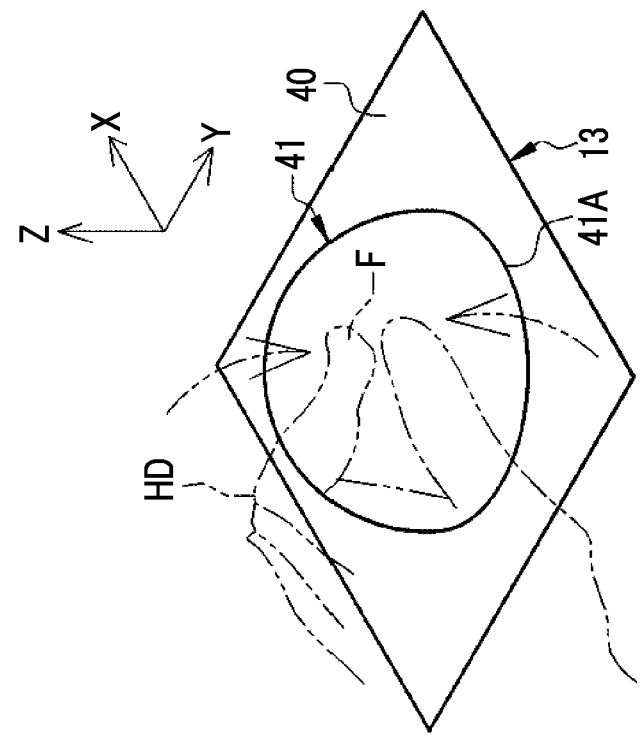
FIGS. 14A and 14B are diagrams illustrating a pinch-in operation and a pinch-out operation.
Figure 14A:
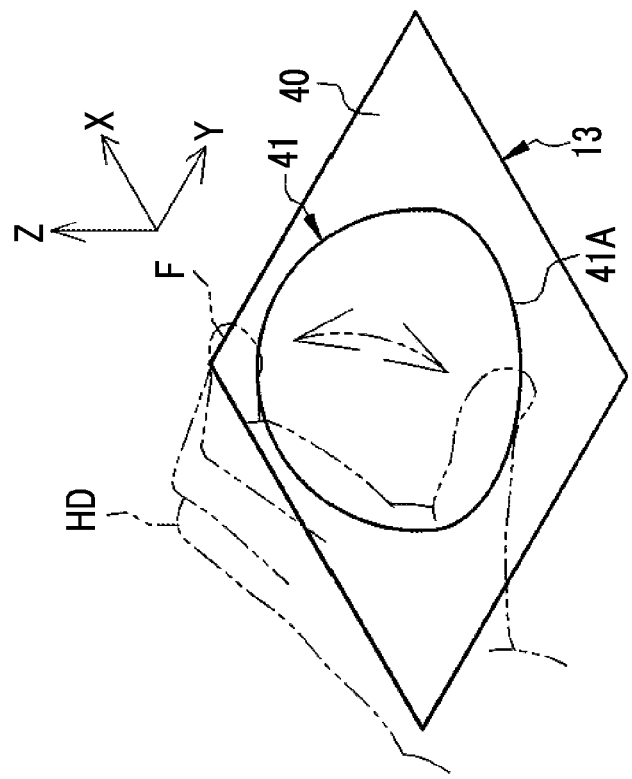

FIGS. 14A and 14B illustrate a gesture operation in which the thumb and the forefinger corresponding to at least two fingers F are brought into contact with the three-dimensional portion 41 and then the thumb and the forefinger are slid on the three-dimensional portion 41. FIG. 14A illustrates a state where the thumb and the forefinger in a state of being separate from each other are brought into contact with the three-dimensional portion 41 and then the thumb and the forefinger are moved in a direction of becoming closer to each other. FIG. 14B illustrates a state where the thumb and the forefinger are moved in a direction of becoming farther from each other. Similar to cases of FIGS. 13A and 13B, a case before the fingers F are moved in FIG. 14A is just a state illustrated in FIG. 14B and a case before the fingers F are moved in FIG. 14B is just a state illustrated in FIG. 14A. The gesture operation in FIG. 14A is referred to as a pinch-in operation below. The gesture operation in FIG. 14B is referred to as a pinch-out operation below.

The pinch-in operation and the pinch-out operation are performed, for example, at a time of volume control and music selection of the car audio system AP and temperature control of the car air-conditioner AP. For example, in a case where the pinch-in operation is performed in a state where the volume control bar 33 is displayed as illustrated in FIG. 4, the cursor 34 moves upward and the volume is increased. In a case where the pinch-out operation is performed, the cursor 34 moves downward and the volume is decreased.

Figure 15:
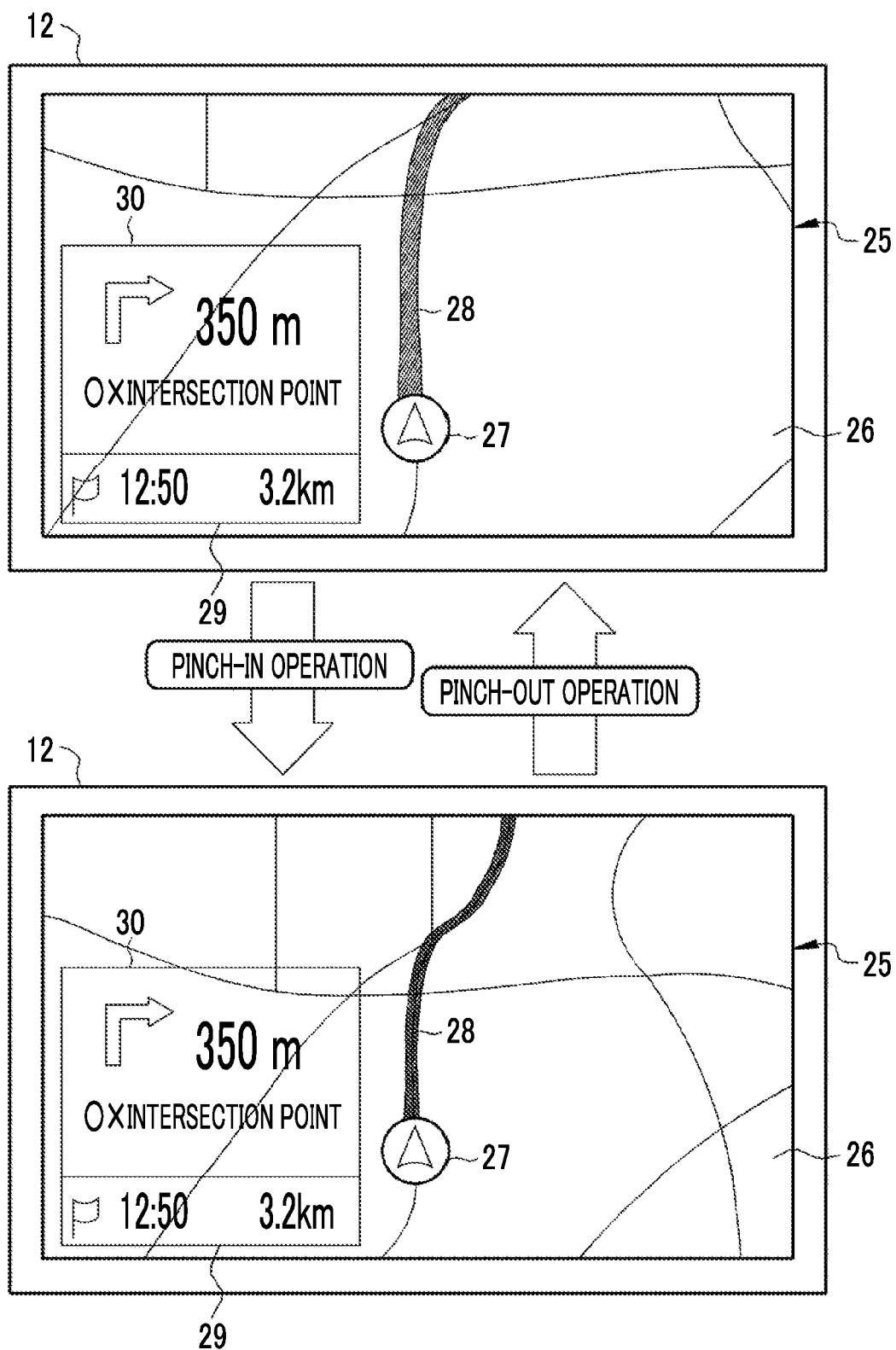
FIG. 15 is a diagram illustrating a form in which a display range of a map is reduced or enlarged by the pinch-in operation or the pinch-out operation.

As illustrated in FIG. 15, in a case where the pinch-in operation is performed in a state where the map display screen 25 is displayed, the display range of the map 26 is reduced similar to a case of the pick-up operation. In a case where the pinch-out operation is performed, the display range of the map 26 is expanded similar to a case of the spread operation.

Figure 16:
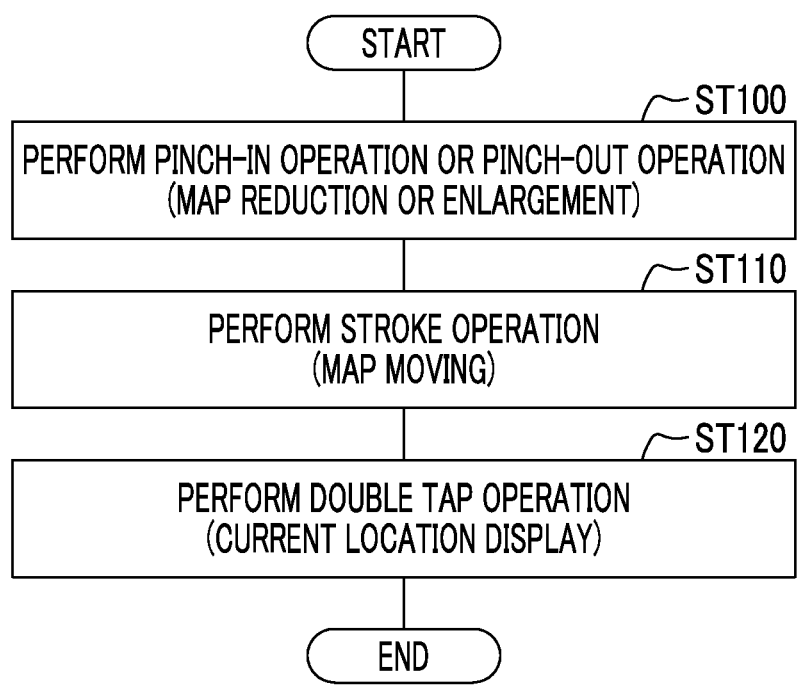
FIG. 16 is a flowchart illustrating a procedure of a gesture operation in a case of changing the display range of the map.

FIG. 16 illustrates procedures of a series of gesture operations. Here, a case of changing the display range of the map 26 will be described as an example. First, as shown in Step ST100, the pinch-in operation or the pinch-out operation is performed in a state where the map display screen 25 is displayed. Thus, the display range of the map 26 is expanded or reduced. As shown in Step ST110, the stroke operation is performed, and thus the map 26 is moved. As shown in Step ST120, the double tap operation is performed, and thus the map 26 is brought back to the state of the current location display.

Notification sound is output from the speaker 14 during the series of gesture operations. For example, in Step ST100, notification sound of "the map is reduced" and "scale of 500 m" is output. In Step ST110, notification sound of "the map is moved to the north from the current location" is output. In Step ST120, notification sound of "return to the current location display" is output. The notification sound may be output only in a state of a manual operation in which a driver sitting on the driver's seat 20 manually operates the steering wheel 19 to drive. The notification sound may be output regardless of a time when the driver manually operates and when the driver stops the car.

Figure 17:
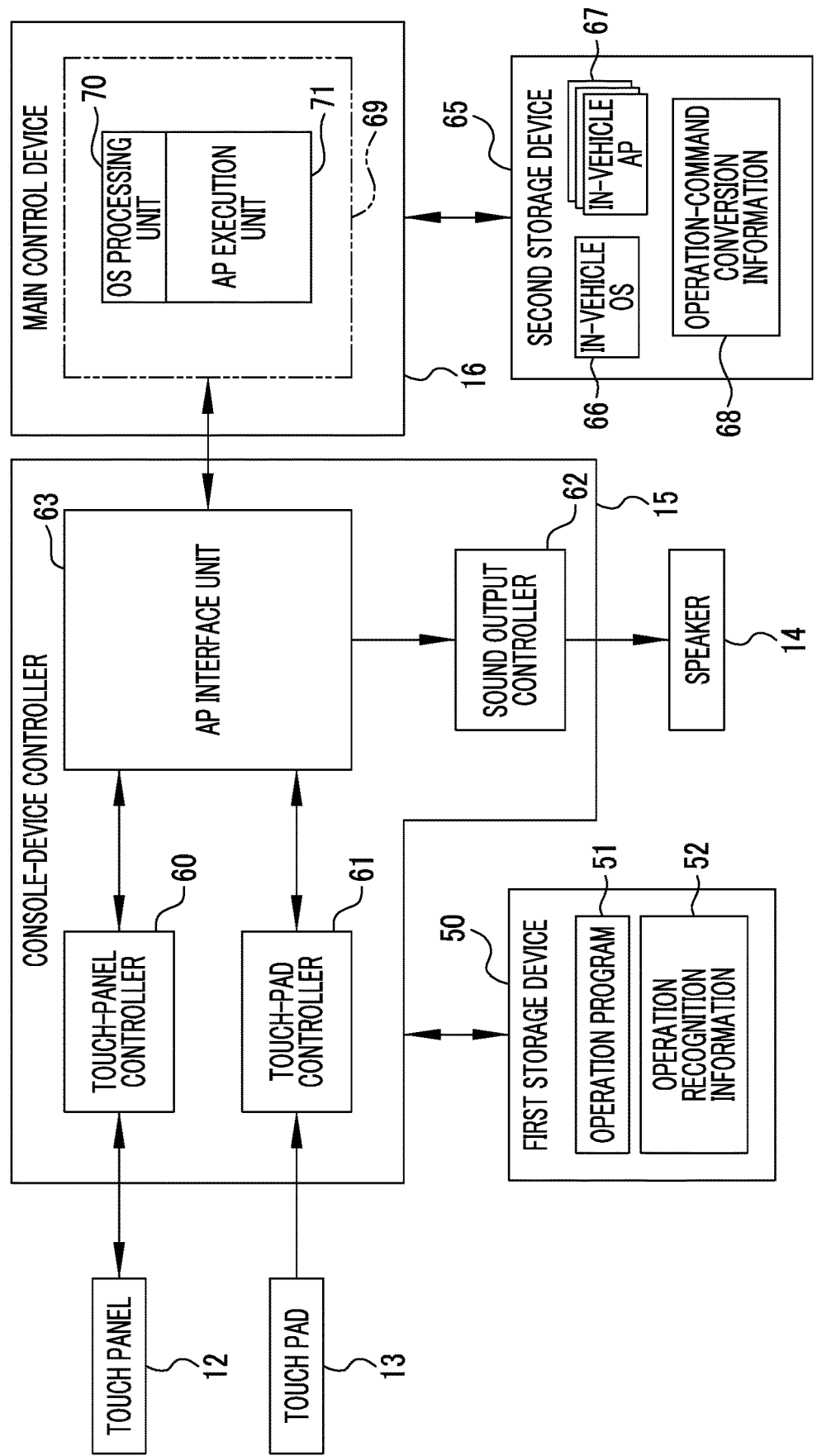
FIG. 17 is a block diagram illustrating a console-device controller and a main control device.

In FIG. 17, a first storage device 50 is connected to the console-device controller 15. The first storage device 50 stores an operation program 51 and operation recognition information 52 (see FIG. 20).

If the operation program 51 is started, the console-device controller 15 functions as a touch-panel controller 60, a touch-pad controller 61, a sound output controller 62, and an AP interface unit 63.

The touch-panel controller 60 recognizes a gesture operation for various screens displayed in the touch panel 12. The touch-panel controller 60 outputs information (hereinafter, gesture information) of the recognized gesture operation to the AP interface unit 63. Similarly, the touch-pad controller 61 recognizes a gesture operation on the operation area of the touch pad 13. Thus, the touch-pad controller 61 outputs gesture information to the AP interface unit 63.

The AP interface unit 63 transmits the pieces of gesture information from both the controllers 60 and 61 to the main control device 16 and receives control information from the main control device 16. The control information includes screen related information such as update information of the map display screen 25 or sound information such as notification sound for the gesture operation.

The AP interface unit 63 outputs the control information to the touch-panel controller 60 in a case where the control information is screen related information, and outputs the control information to the sound output controller 62 in a case where the control information is sound information. The touch-panel controller 60 controls display of the various screens based on the screen related information from the AP interface unit 63. The sound output controller 62 outputs sound based on the sound information from the AP interface unit 63, from the speaker 14.

A second storage device 65 is connected to the main control device 16. The second storage device 65 stores an in-vehicle operating system (OS) 66 or the in-vehicle APs 67 of the car navigation AP, the car air-conditioner AP, and the car audio system AP. The second storage device 65 stores operation-command conversion information 68 (see FIG. 25). Although not illustrated, the second storage device 65 also stores programs for controlling the system other than the console system 10, for example, a control program of a transmission (such as continuously variable transmission (CVT)) and a control program of a collision avoidance system.

A central processing unit (CPU) 69 of the main control device 16 functions as an OS processing unit 70 and an AP execution unit 71 by loading and executing the in-vehicle OS 66 and the in-vehicle APs 67. The OS processing unit 70 performs processing relating to the in-vehicle OS 66. The AP execution unit 71 performs the functions of the in-vehicle APs 67 under surveillance of the OS processing unit 70. The AP execution unit 71 transmits screen related information or sound information in response to the gesture information from the AP interface unit 63 to the AP interface unit 63 as control information.

Details of the function performed by the AP execution unit 71 are, for example, as follows. Firstly, as the functions of the car navigation AP, the map (current location) display function, the viewpoint switching function, the destination searching function, or the facility searching function is performed. In a case where a destination is set, the navigation function, for example, searching for a traveling route 28, display of the searched traveling route 28, first navigation information 29, and second navigation information 30, and output of guide sound is performed. As the functions of the car air-conditioner AP, the temperature control function, an air volume control function, and an air direction control function are performed. The AP execution unit 71 performs various reproduction functions, the volume control function, and the music selection function as the functions of the car audio system AP.

In a case of the car navigation AP, the map display screen 25 for the current location display, the map display screen 25 in which the map 26 is moved, enlarged, or reduced, guide sound, and the like are provided as the control information transmitted to the AP interface unit 63 by the AP execution unit 71. The map display screen 25 and the like in which display is updated in accordance with temperature control, air volume control, or air direction control are provided as the control information in a case of the car air-conditioner AP. The map display screen 25 and the like including a video and sound of television broadcasts or sound of radio broadcasts, sound of music, and the volume control bar 33 are provided as the control information in a case of the car audio system AP.

The OS processing unit 70 corresponds to multitasking, and thus can cause the AP execution unit 71 to simultaneously perform the functions of the in-vehicle APs 67 of types different from each other, in parallel with each other. For example, the reproduction function of the car audio system AP is performed and further the temperature control function of the car air-conditioner AP is performed, in the process of performing the navigation function of the car navigation AP.

Figure 18:
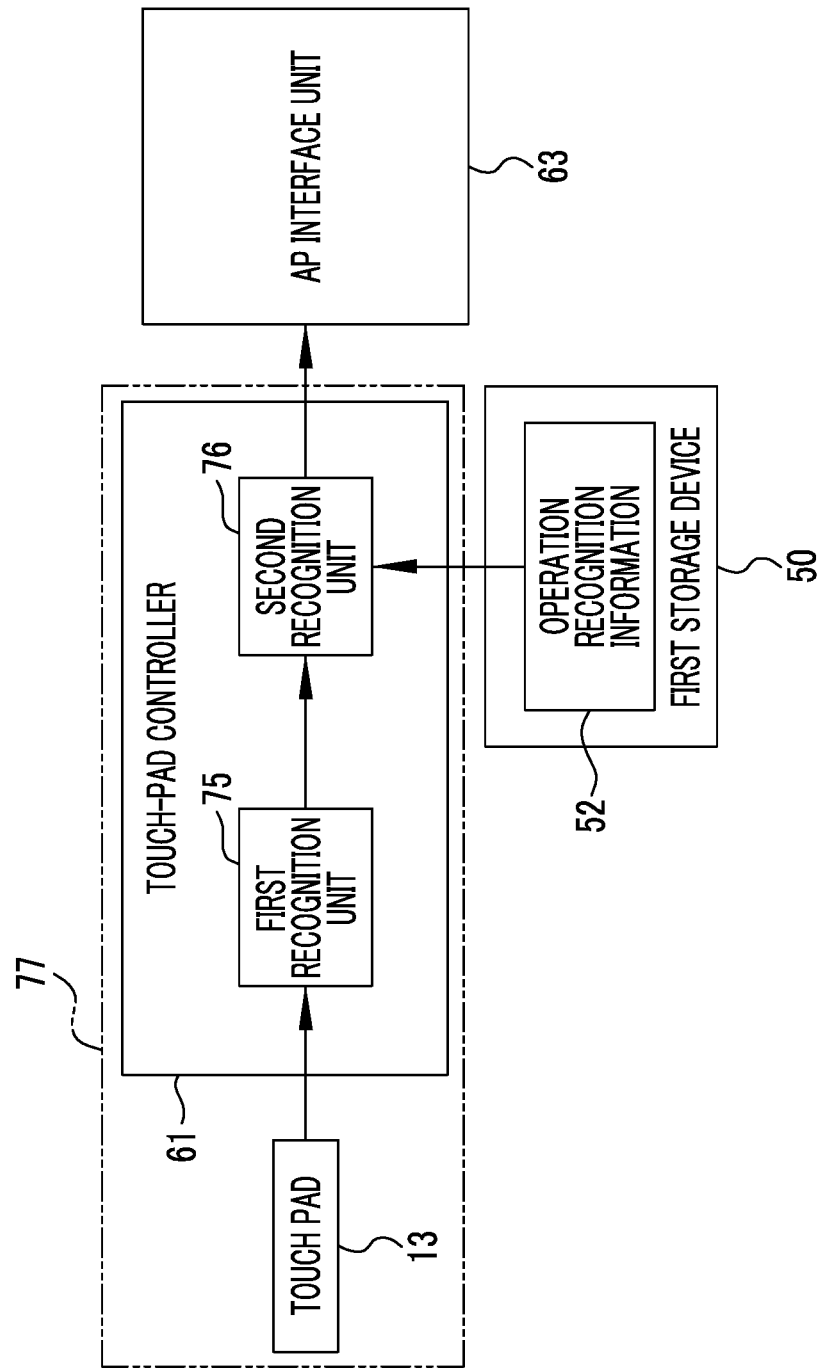
FIG. 18 is a block diagram illustrating a touch-pad controller.

In FIG. 18, the touch-pad controller 61 includes a first recognition unit 75 and a second recognition unit 76. That is, the touch-pad controller 61 constitutes a touch type operation device 77 according to the present invention, along with the touch pad 13.

The first recognition unit 75 performs a first recognition function of recognizing contact positions of fingers F into the entire operation area of the touch pad 13, which includes the spherical operation area, and of recognizing a movement trajectory of the fingers F in the entire operation area of the touch pad 13, which includes the spherical operation area, based on a detection signal from the touch pad 13. The first recognition unit 75 outputs the contact positions and the movement trajectory of the fingers F, which have been recognized, to the second recognition unit 76.

The second recognition unit 76 performs a second recognition function of recognizing a gesture operation performed on the entire operation area of the touch pad 13, which includes the spherical operation area, based on the contact positions and the movement trajectory of the fingers F from the first recognition unit 75 and operation recognition information 52. The second recognition unit 76 outputs gesture information of the recognized gesture operation to the AP interface unit 63.

The first recognition unit 75 recognizes an intersection point IP between the first electrode 47A and the second electrode 47B to be a contact position of the finger F, based on a detection signal. More specifically, the first recognition unit 75 recognizes an intersection point IP at which the detection signal has the external value among a plurality of intersection points IP which are adjacent to the first electrode 47A and the second electrode 47B, to be the contact position of the finger F.

Figure 19:
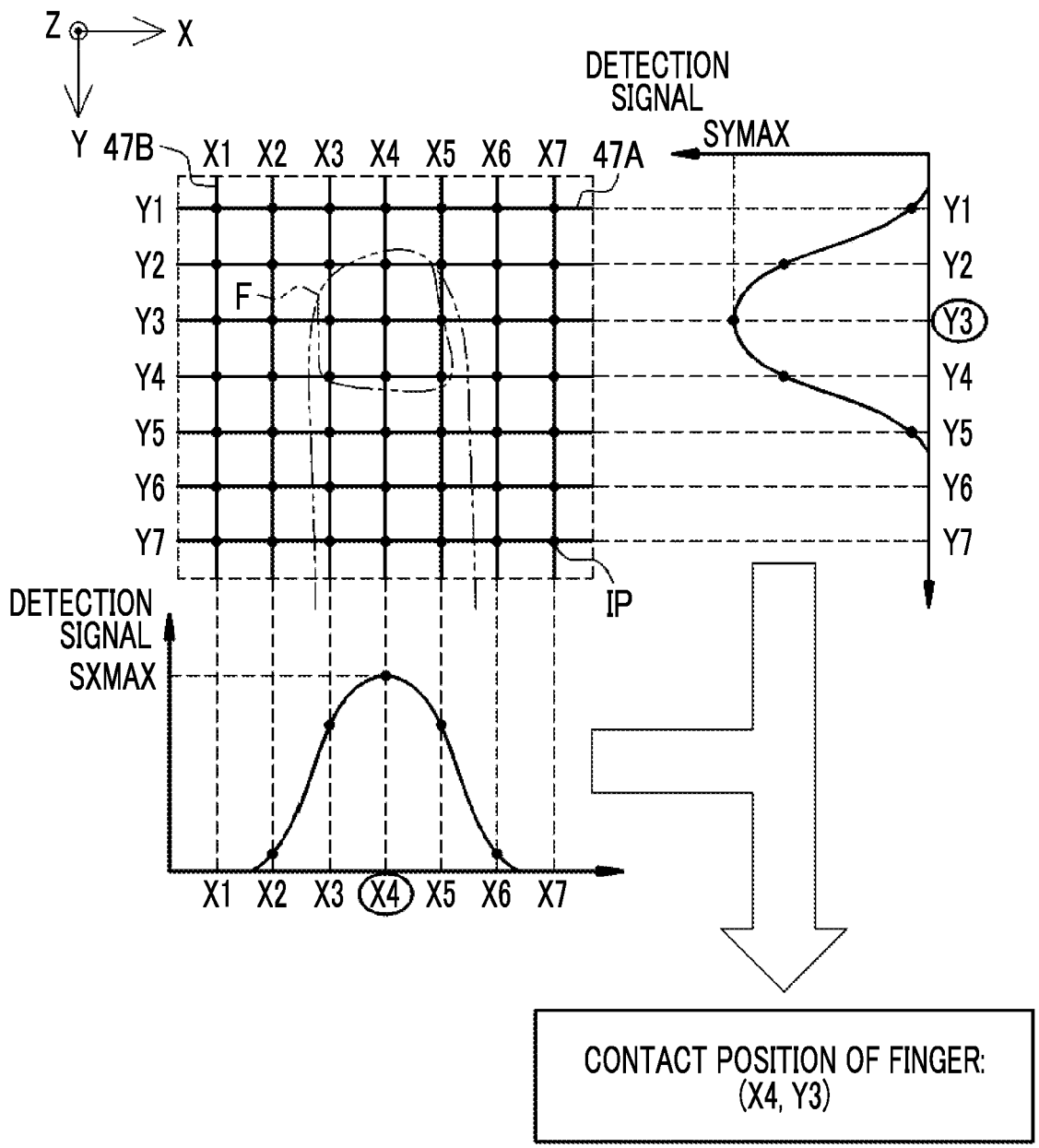
FIG. 19 is a diagram illustrating a function of a first recognition unit that recognizes an intersection point between a first electrode and a second electrode, at which a detection signal has an external value, to be a contact position of a finger.

FIG. 19 illustrates an example of a detection signal the finger F in a certain portion of the operation area of the touch pad 13, in which Y1, Y2, . . . , and Y7 are arranged as the first electrode 47A and X1, X2, . . . , and X7 are arranged as the second electrode 47B. The detection signal has the external value at a position at which the finger F comes into the closest contact and thus electrostatic capacity changes largest. In FIG. 19, the detection signal has the maximum value SYMAX as the external value, in Y3 among first electrodes Y1 to Y7. The detection signal has the maximum value SXMAX as the external value, in X4 among second electrodes X1 to X7. In this case, the first recognition unit 75 recognizes an intersection point IP represented by the coordinates of (X4, Y3) to be a contact position of the finger F. Here, it is assumed that the detection signal has a positive value and the external value is the maximum value. However, in a case where the detection signal has a negative value, the external value is the minimum value.

In a case where a gesture operation other than the tap operation, such as the rotary slide operation, the stroke operation, or the pinch-in operation is performed, the fingers F of a user continuously come into contact at a plurality of positions in the operation area of the touch pad 13, with a time gap. In this case, detection signals indicating the contact positions of the fingers F are continuously input to the first recognition unit 75. The first recognition unit 75 obtains the coordinates of the intersection point IP indicating the contact position of the finger F as illustrated in FIG. 19 each time the detection signals are continuously input, based on the detection signals. The first recognition unit 75 recognizes a set of obtained coordinates to be a trajectory of contact positions of the fingers F, that is, a movement trajectory of the fingers F.

For example, in a case where the finger F moves downward in the Y-axis direction from the state illustrated in FIG. 19 and stops on the first electrode Y7, the movement trajectory of the finger F starts at an intersection point IP having coordinates of (X4, Y3) as a start point, passes through intersection points IP having coordinates of (X4, Y4), (X4, Y5), and (X4, Y6), and then stops at an intersection point IP having coordinates of (X4, Y7) as an end point. As described above, the contact positions and the movement trajectory of the finger F correspond to pieces of coordinate information of the intersection points IP, in practice.

The first recognition unit 75 also recognize the number of fingers F coming into contact with the operation area of the touch pad 13. Specifically, the first recognition unit 75 recognizes the number of contact positions of the recognized fingers F to be the number of fingers F in contact.

In FIG. 20, the operation recognition information 52 stores a gesture operation corresponding to a set of the contact position of the finger F in the operation area of the touch pad 13, the number of fingers F in contact, and the movement trajectory. The second recognition unit 76 checks a gesture operation corresponding to a set of the contact position of the finger F from the first recognition unit 75, the number of fingers in contact, and the movement trajectory, by using the operation recognition information 52.

As with (XRP1, YRP1) and (XRP2, YRP2), in practice, coordinate information of the intersection point IP is registered as the contact position. (XRP1, YRP1) indicates coordinate information of an intersection point IP at the lower circumference 41A. (XRP2, YRP2) indicates coordinate information of an intersection point IP in the three-dimensional portion 41. As illustrated with X1 to X7 and Y1 to Y7 in FIG. 19, specifically, the coordinate information means symbols or numbers which are sequentially attached to the first electrode 47A and the second electrode 47B.

For example, in a case where the contact position is the lower circumference 41A, the number of fingers in contact is at least two, and the movement trajectory is along the lower circumference 41A, the second recognition unit 76 recognizes the gesture operation to be the rotary slide operation. In a case where the contact position is the three-dimensional portion 41, the number of fingers in contact is at least one, there is no movement trajectory, and the detection signal is output once during a predetermined time, the second recognition unit 76 recognizes the gesture operation to be the single tap operation.

Further, in a case where the contact position is the three-dimensional portion 41, the number of fingers in contact is at least two, and an arc-shaped movement trajectory in which at least two fingers F become closer to each other or a movement trajectory along a center line CL (see FIG. 23) of the three-dimensional portion 41 is provided, in which at least two fingers F become closer to each other is provided, the second recognition unit 76 recognizes the gesture operation to be the pinch-in operation.

Figure 21B:
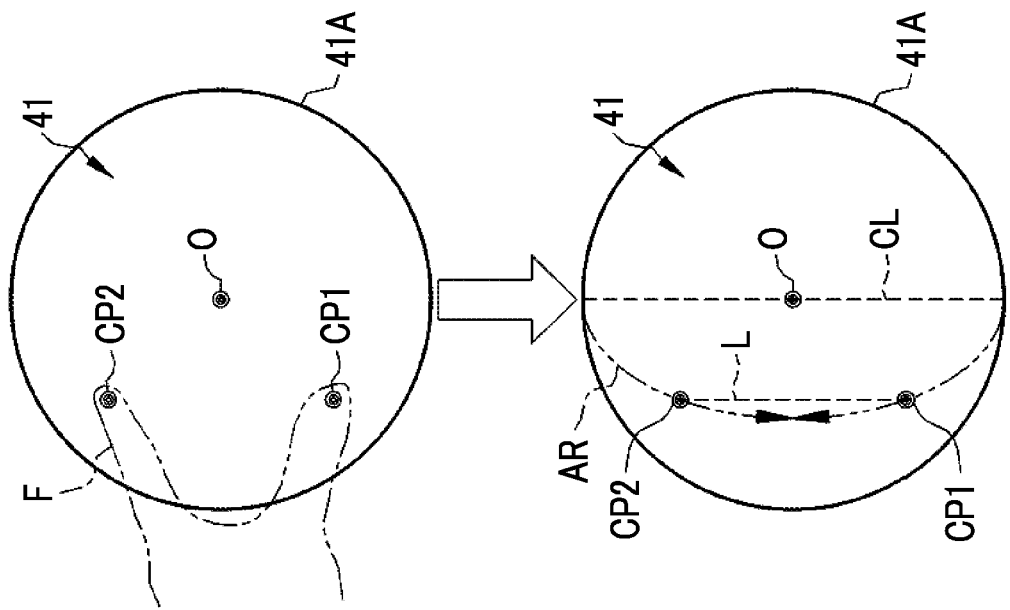
FIGS. 21A and 21B are diagrams illustrating examples of a movement trajectory of fingers for the pinch-in operation.
Figure 21A:
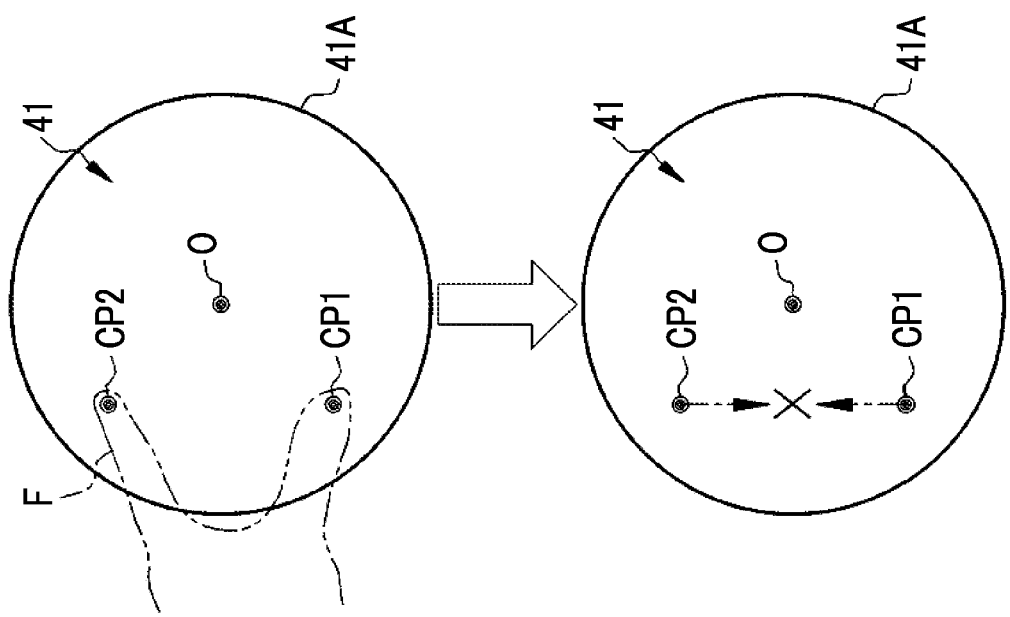

Here, as illustrated in FIGS. 21A and 21B, a case where contact positions CP1 and CP2 (here, contact position of thumb is CP1 and contact position of forefinger is CP2) of at least two fingers F in the pinch-in operation are shifted from the center O of the three-dimensional portion 41 and have the same height is considered.

In this case, as indicated by a two-dot chain line and an x mark at the lower part of an arrow in FIG. 21A, the movement trajectory of the fingers F is not along a straight line L (see lower part of an arrow in FIG. 21B) connecting the contact positions CP1 and CP2 of the two fingers, in a case where the spherical operation area constituted by the outer circumferential surface of the three-dimensional portion 41 is viewed in a plan view. As indicated by a two-dot chain line at the lower part of the arrow in FIG. 21B, the movement trajectory of the fingers F is along an arc AR which passes through the contact positions CP1 and CP2 of the two fingers F, whose chord is the center line CL of the three-dimensional portion 41 parallel to the straight line L, in a case where the spherical operation area is viewed in a plan view. That is, the movement trajectory of the finger F is an arc-shaped movement trajectory which is bulged outwardly in a case where the spherical operation area is viewed in a plan view. As in the example, if the three-dimensional portion 41 is obtained by dividing a sphere in half, the center line CL as the chord of the arc AR corresponds to a diameter of the three-dimensional portion 41.

Figure 22:
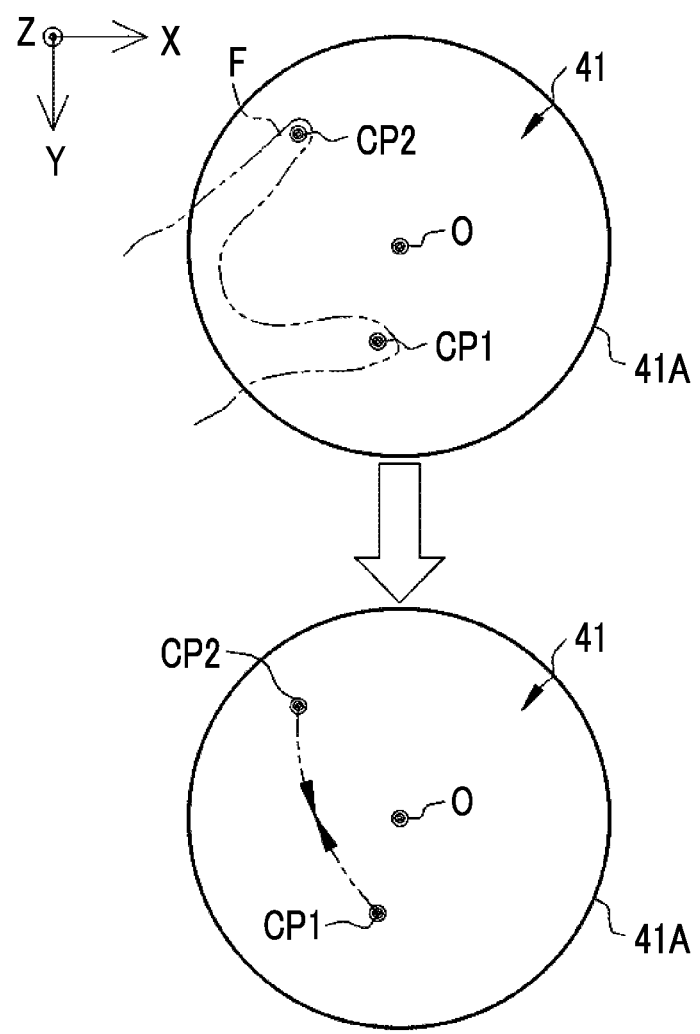
FIG. 22 is a diagram illustrating another example of the movement trajectory of the fingers for the pinch-in operation.

FIG. 22 is the same as a case in FIGS. 21A and 21B in that the contact positions CP1 and CP2 of the two fingers F in the pinch-in operation are shifted from the center O of the three-dimensional portion 41, but is different from the case in FIGS. 21A and 21B in that the contact positions CP1 and CP2 of the two fingers F do not have the same height (in FIG. 22, the contact position CP2 is lower than the contact position CP1). In this case, the movement trajectory of the fingers F is not along the arc AR (see FIG. 21B) as in the case of FIGS. 21A and 21B. However, as indicated by a two-dot chain line at the lower part of an arrow, the movement trajectory is an arc-shaped movement trajectory which is bulged outwardly in a case where the spherical operation area is viewed in a plan view.

Such an arc-shaped movement trajectory is a trajectory which is unique to the spherical operation area, is presumed to be naturally drawn in a case where two fingers F become closer to each other and is considered to allow two fingers F to become closer to each other with the minimum movement energy. The arc-shaped movement trajectory is recognized to be a pinch-in operation with a stroke operation in a diagonal direction, if the operation area is planar. However, similar to a case where the operation area is planar, if the arc-shaped movement trajectory is recognized to be a pinch-in operation with a stroke operation in the diagonal direction, the map 26 moves even though the user performs the pinch-in operation with the intention to only reduce the display size of the map 26. That is, processing unintended by a user is performed and usability is deteriorated.

Thus, in a case where the movement trajectories of two fingers F are arc-shaped movement trajectories which are bulged outwardly in a case where the spherical operation area is viewed in a plan view, the second recognition unit 76 recognizes the gesture operation of the two fingers to be the same gesture operation as the pinch-in operation in which the movement trajectories of two fingers are straight lines in a case where the operation area is planar.

Figure 23:
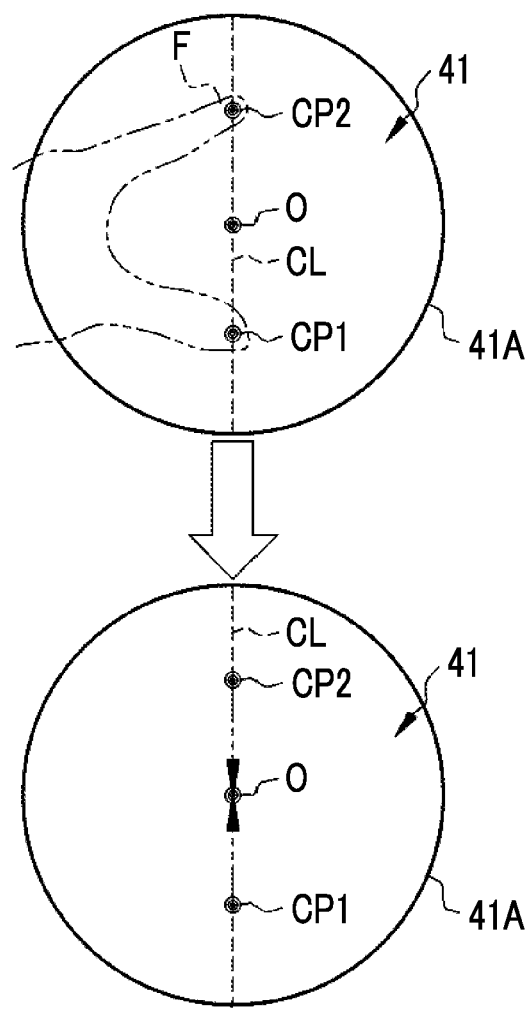
FIG. 23 is a diagram illustrating still another example of the movement trajectory of the fingers for the pinch-in operation.

Next, as illustrated in FIG. 23, a case where the contact positions CP1 and CP2 of two fingers F in the pinch-in operation are on the center line CL of the three-dimensional portion 41 is considered. In this case, the movement trajectory of the fingers F is along the center line CL, as indicated by a two-dot chain line at the lower part of an arrow.

That is, in a case where the contact positions CP1 and CP2 of two fingers F are on the center line CL of the three-dimensional portion 41, the movement trajectories of the two fingers F are straight lines, similar to a case where the operation area is planar, in a case where the spherical operation area is viewed in a plan view. In other words, in a case where the contact positions CP1 and CP2 of two fingers F are not on the center line CL of the three-dimensional portion 41, all movement trajectories of the two fingers F are arc-shaped movement trajectories. Similar to the arc-shaped movement trajectory, the movement trajectory along the center line CL is also a trajectory which is presumed to be naturally drawn in a case where two fingers F on the center line CL of the three-dimensional portion 41 become closer to each other and is considered to allow two fingers F to become closer to each other with the minimum movement energy.

As illustrated in FIG. 23, in a case where the contact positions CP1 and CP2 of two fingers F are on the center line CL and the movement trajectories of the two fingers F are along the center line CL, similar to a case of being the arc-shaped movement trajectory, the second recognition unit 76 recognizes the gesture operation of the two fingers F to be the same gesture operation as the pinch-in operation in which the movement trajectories of the two fingers are straight lines in a case where the operation area is planar.

Here, the practical movement trajectory of the finger F from the first recognition unit 75 is not limited to completely coinciding with an ideal arc-shaped movement trajectory or a movement trajectory along the center line CL and some fluctuations are provided. Thus, the second recognition unit 76 obtains the ideal arc-shaped movement trajectory or the movement trajectory along the center line CL with excluding fluctuations, from the practical movement trajectory of the finger F from the first recognition unit 75. An allowable range TR (see FIG. 24) of an error is set for the ideal arc-shaped movement trajectory or the movement trajectory along the center line CL. The second recognition unit 76 compares the practical movement trajectory of the finger F from the first recognition unit 75 to an ideal arc-shaped movement trajectory obtained from the practical movement trajectory of the finger F or to the movement trajectory along the center line CL. In a case where an error between the practical movement trajectory of the finger F, and the ideal arc-shaped movement trajectory or the movement trajectory along the center line CL is within the allowable range TR, it is determined that the practical movement trajectory of the finger F coincides with the ideal arc-shaped movement trajectory or the movement trajectory along the center line CL.

FIG. 24 illustrates an example of the allowable range TR set for the arc AR in FIG. 21B as the ideal arc-shaped movement trajectory. The allowable range TR is a band-like area which uses the arc AR as the center line and has a width W. The width W of the allowable range TR is set based on the average value of widths of fingers F. The average value of the widths of fingers F of an adult is about 15 mm to about 20 mm. Therefore, the width W is set, for example, to be equal to the average value of the widths of fingers F, that is, to be about 15 mm to about 20 mm. The width W may be, for example, twice or the half of the average value of the widths of the fingers F. The width W may be set regardless of the average value of the widths of the fingers F.

In FIG. 25, in the operation-command conversion information 68, an operation command corresponding to each gesture operation is stored in association with a processing status. The operation command is obtained by converting each gesture operation to a form which can be understood by the AP execution unit 71. The processing status is information indicating an operation situation of the console system 10, such as a display state of the map display screen 25 and a performing state of the functions of the in-vehicle APs 67 by the AP execution unit 71.

Among gesture operations, a gesture operation to which an operation command varying depending on the processing status is assigned is provided. For example, regarding the pick-up operation, an operation command of reducing the display range of the map 26 is assigned in a state where the menu bar 31 is not displayed, and an operation command of not displaying the menu bar 31 is assigned in a state where the menu bar 31 has been displayed. Further, an operation command of not displaying the volume control bar 33 and setting the volume selected by the cursor 34 at this time is assigned in a state where the volume control bar 33 is displayed in a pull-down manner.

Similar to the pick-up operation, regarding the pinch-in operation, an operation command of reducing the display range of the map 26 is assigned in a state where the menu bar 31 is not displayed, and an operation command of increasing the volume is assigned in a state where the volume control bar 33 is displayed in a pull-down manner.

The OS processing unit 70 understands the processing status by surveilling the AP execution unit 71. The OS processing unit 70 converts a gesture operation indicated by the gesture information from the AP interface unit 63 into an operation command based on the processing status and the operation-command conversion information 68. The OS processing unit 70 transmits the operation command obtained by the conversion to the AP execution unit 71. The AP execution unit 71 performs the function corresponding to the operation command transmitted from the OS processing unit 70.

In FIG. 25, operation commands of the in-vehicle APs 67, which have different types, such as map reduction of the car navigation AP and volume control (volume increase or decrease) of the car audio system AP are collectively registered in one piece of operation-command conversion information 68. However, the operation-command conversion information 68 may be provided for each in-vehicle AP 67.

An action with the above configuration will be described with reference to the flowcharts in FIGS. 26 and 27. Firstly, if a power switch such as an ignition switch of an automobile is operated by a user and power of the console system 10 turns into an ON state, the operation program 51 is started. Thus, as illustrated in FIG. 17, the console-device controller 15 functions as the controllers 60 to 62 and the AP interface unit 63. As illustrated in FIG. 18, the first recognition unit 75 and the second recognition unit 76 are constructed in the touch-pad controller 61 constituting the touch type operation device 77.

The OS processing unit 70 and the AP execution unit 71 are constructed in the CPU 69 of the main control device 16. The map display function of the car navigation AP is performed by the AP execution unit 71. Thus, as illustrated in FIG. 2, the map display screen 25 is displayed in the touch panel 12.

In a case where a gesture operation is performed on the operation area of the touch pad 13 by the user (YES in Step ST500), a detection signal of the finger F is output from the touch pad 13 to the first recognition unit 75. In the first recognition unit 75, the contact position of the finger F, the number of fingers in contact, and a movement trajectory are recognized based on the detection signal (Step ST510, first recognition step). At this time, as illustrated in FIG. 19, an intersection point IP at which the detection signal has the external value among the plurality of intersection points IP which are adjacent to the first electrode 47A and the second electrode 47B is recognized to be the contact position of the finger F.

The second recognition unit 76 recognizes the gesture operation based on the contact position of the finger F, the number of fingers in contact, and the movement trajectory from the first recognition unit 75, and operation recognition information 52 (Step ST520, second recognition step). Gesture information corresponding to the gesture operation is output from the second recognition unit 76 to the AP interface unit 63 (Step ST530). The series of processes is continuously repeated until the power turns into an OFF state (YES in Step ST540).

Figure 26:
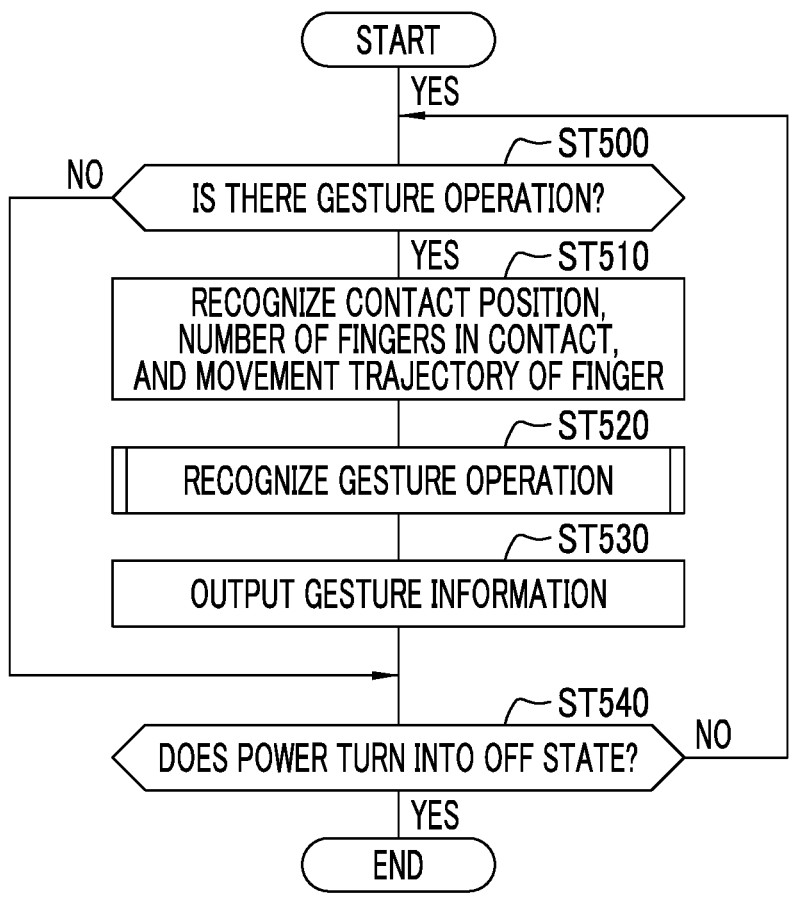
FIG. 26 is a flowchart illustrating a processing procedure of a console system.
Figure 27:
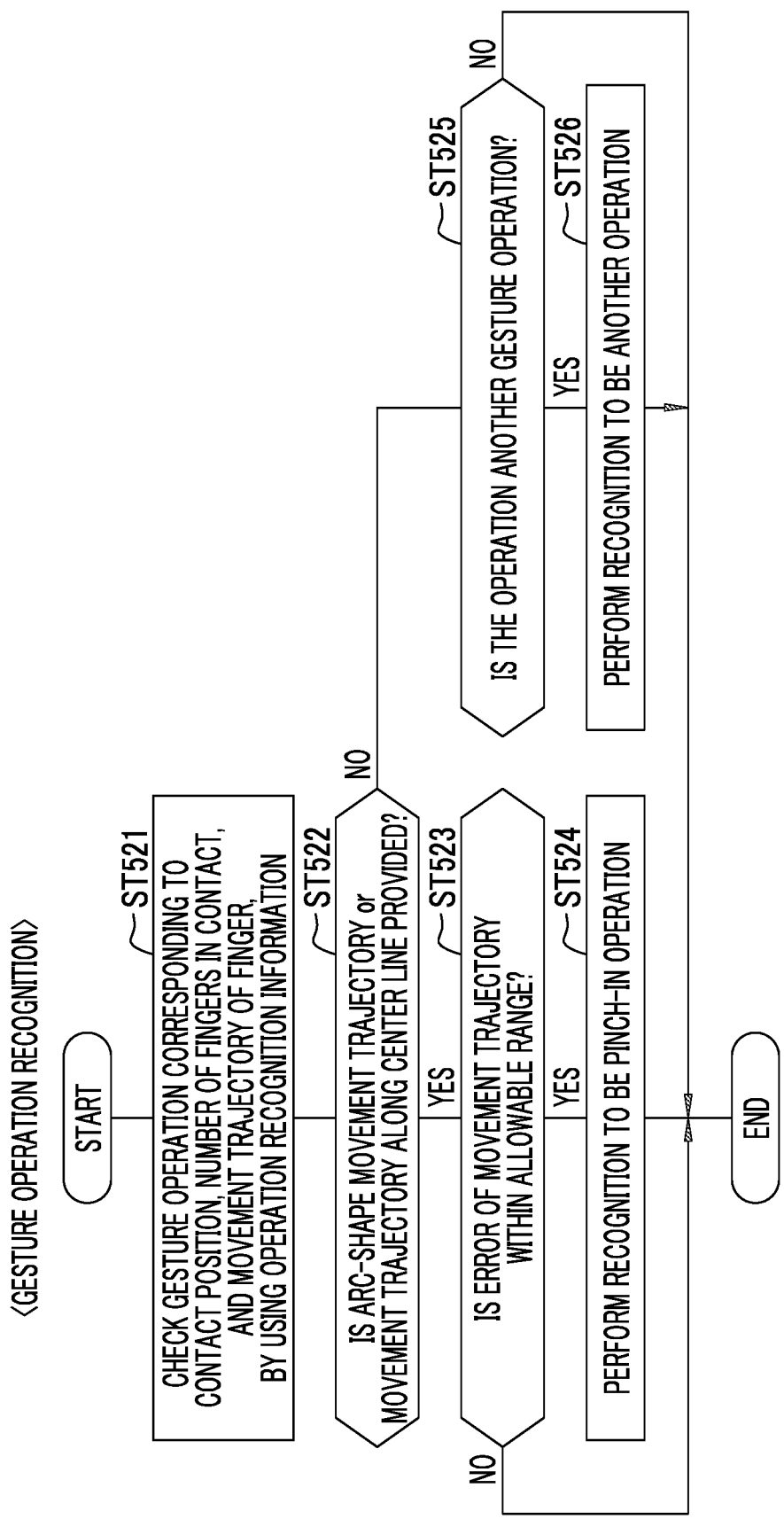
FIG. 27 is a flowchart illustrating a processing procedure of gesture operation recognition by a second recognition unit.

FIG. 27 illustrates a processing procedure of a subroutine of recognizing the gesture operation in Step ST520 in FIG. 26. In the second recognition unit 76, firstly, a gesture operation corresponding to a set of the contact position of the finger F, the number of fingers in contact, and the movement trajectory from the first recognition unit 75 is checked from the operation recognition information 52 (Step ST521).

In a case where the contact position is the three-dimensional portion 41, the number of fingers in contact is at least two, and an arc-shaped movement trajectory in which at least two fingers F become closer to each other or a movement trajectory which is along the center line CL of the three-dimensional portion 41 and in which at least two fingers F become closer to each other is provided (YES in Step ST522), the second recognition unit 76 determines whether or not an error between the practical movement trajectory of the finger F from the first recognition unit 75, and an ideal arc-shaped movement trajectory or a movement trajectory along the center line CL is within the allowable range TR (Step ST523).

In a case where the error between the practical movement trajectory of the finger F from the first recognition unit 75, and the ideal arc-shaped movement trajectory or the movement trajectory along the center line CL is within the allowable range TR (YES in Step ST523), the second recognition unit 76 recognizes the gesture operation to be a pinch-in operation (Step ST524).

In a case of being another gesture operation (NO in Step ST522, YES in Step ST525), the second recognition unit 76 recognizes the gesture operation to be another gesture operation (Step ST526). For example, in a case where the contact position is the lower circumference 41A, the number of fingers in contact is at least two, and a movement trajectory is along the lower circumference 41A, the second recognition unit 76 recognizes the gesture operation to be a rotary slide operation. In a case where the contact position is the three-dimensional portion 41, the number of fingers in contact is at least one, and a movement trajectory is along the three-dimensional portion 41, the second recognition unit 76 recognizes the gesture operation to be a stroke operation.

In the main control device 16, the OS processing unit 70 converts a gesture operation indicated by the gesture information from the AP interface unit 63 into an operation command based on operation-command conversion information 68. The operation command is transmitted from the OS processing unit 70 to the AP execution unit 71. In the AP execution unit 71, the function corresponding to the operation command is performed. Thus, control information is transmitted from the AP execution unit 71 to the AP interface unit 63.

The control information is output from the AP interface unit 63 to the controllers 60 to 62. Thus, for example, as illustrated in FIG. 15, the display range of the map 26 on the map display screen 25 is reduced or expanded in accordance with the pinch-in operation or the pinch-out operation. In addition, the volume control bar 33 is displayed on the map display screen 25 so as to allow volume control of the car audio system AP in accordance with the rotary slide operation and the single tap operation. The notification sound for the gesture operation is output from the speaker 14.

In a case where movement trajectories of two fingers F are arc-shaped movement trajectories which bulge outwardly in a case where the spherical operation area constituted by the outer circumferential surface of the three-dimensional portion 41 is viewed in a plan view, the second recognition unit 76 recognizes the gesture operation of the two fingers F to be the same gesture operation as the pinch-in operation in a case where the operation area is planar. Therefore, a situation in which the arc-shaped movement trajectory is recognized to be the pinch-in operation with a stroke operation in the diagonal direction, and thus the display range of the map 26 and the map 26 is moved does not occur. That is, it is possible to prevent the occurrence of a situation in which processing unintended by the user is performed by the pinch-in operation on the spherical operation area of the touch pad 13, and to improve usability.

Even in a case where the contact positions of two fingers F are on the center line CL of the three-dimensional portion 41 and movement trajectories of the two fingers F are along the center line CL, the second recognition unit 76 recognizes the gesture operation of the two fingers to be the same gesture operation as the pinch-in operation. Therefore, similar to a case where the operation area is planar, a movement trajectory along the center line CL, which is a movement trajectory having a straight-line shape can also be recognized to be the correct pinch-in operation.

In a case where an error between the practical movement trajectory recognized by the first recognition unit 75 and an ideal arc-shaped movement trajectory is within the allowable range TR, the second recognition unit 76 determines that both the movement trajectories coincide with each other. Therefore, even though the movement trajectories of the two fingers F are slightly shifted from the ideal arc-shaped movement trajectory, it is possible to recognize the movement trajectories to be the pinch-in operation. Thus, the user does not need to be conscious of exactly moving the two fingers F to have an arc shape and may move the two fingers F as the force goes. Accordingly, the user does not feel stressed in gesture operation.

If the allowable range TR is too wide, a gesture operation which has been performed by the user without being conscious of the pinch-in operation, and in which two fingers F become closer to each other is erroneously recognized to be the pinch-in operation. On the contrary, if the allowable range TR is too narrow, recognition to be the pinch-in operation is not performed even when the movement trajectories of the two fingers are slightly shifted. Thus, in the embodiment, the allowable range TR is set based on the average value of widths of the fingers F which actually perform the pinch-in operation. If the allowable range TR is set based on the average value of widths of the fingers F, it is possible to recognize the pinch-in operation at appropriate sensitivity.

The first recognition unit 75 recognizes an intersection point IP at which the detection signal has the external value among the plurality of intersection points IP which are adjacent to the first electrode 47A and the second electrode 47B, to be a contact position of the finger F. Therefore, it is possible to reliably narrow the contact position of the finger F to one point.

Since the spherical operation area is set to be the outer circumferential surface of the convex type three-dimensional portion 41 having a hemispherical shape, it is possible to relatively simply manufacture the touch pad 13. Since there is no directivity, it is possible to give the same operation feeling to an access from all angles of the hand HD of the user.

The spherical operation area may be an outer circumferential surface of a three-dimensional portion based on a rugby ball type elliptical sphere in which an ellipse is expanded three-dimensionally. In this case, movement trajectories of two fingers F except for a case where the contact position is on the center line are elliptical arc-shaped movement trajectories which are bulged outward in a case where the spherical operation area is viewed in a plan view.

That is, the spherical shape referred to in the present invention may not be a complete hemispherical shape. Even when the spheroid (elliptical sphere) or the spheroid is slightly deformed, substantially the same effects are obtained in a case where the movement trajectories of two fingers F are arc-shaped movement trajectories which are bulged outwardly in a case where the spherical operation area is viewed in a plan view.

Regarding the range of the specific dimensions of the three-dimensional portion constituting the spherical operation area, a lower limit of the height (step TH between the flat portion 40 and the three-dimensional portion 41 in the first embodiment) with respect to the longest portion diameter of the three-dimensional portion (center line CL as the diameter of the three-dimensional portion 41 in the first embodiment) is $1/100$ (TH≥$1/100$CL), preferably $1/50$ (T≥$1/50$CL), further preferably $1/20$ (TH≤$1/20$CL), and most preferably $1/20$. The upper limit of the height with respect to the longest portion diameter of the three-dimensional portion is 10 times (TH≤10CL), preferably 5 times (TH≤5CL), further preferably two times (TH≤2CL), and most preferably 1.5 times (TH≤1.5CL).

In a case where the height of the three-dimensional portion is lower than the lower limit, the three-dimensional portion is substantially equivalent to a flat portion. Thus, movement trajectories of two fingers F are not arc-shaped movement trajectories which are bulged outwardly in a case where the spherical operation area is viewed in a plan view. Therefore, a case where the height of the three-dimensional portion is lower than the lower limit is handled in the same manner that that in a case of the planar operation area. In a case where the height of the three-dimensional portion is higher than the upper limit, the three-dimensional portion has a shape which is approximate to a cylinder. Thus, the movement trajectories of two fingers F are more approximate to movement trajectories along a side surface of the cylinder than arc-shaped movement trajectories which are bulged outwardly in a case where the spherical operation area is viewed in a plan view.

As described above, it is necessary that the three-dimensional portion constituting the spherical operation area is formed to have dimensions within the range exemplified above and at least a portion thereof has a curved surface shape. In a case where the spherical operation area is not provided and only the planar operation area is provided, movement trajectories which connect positions of two fingers coming into contact with the operation area and are along a straight line are recognized to be the pinch-in operation.

Figure 28:
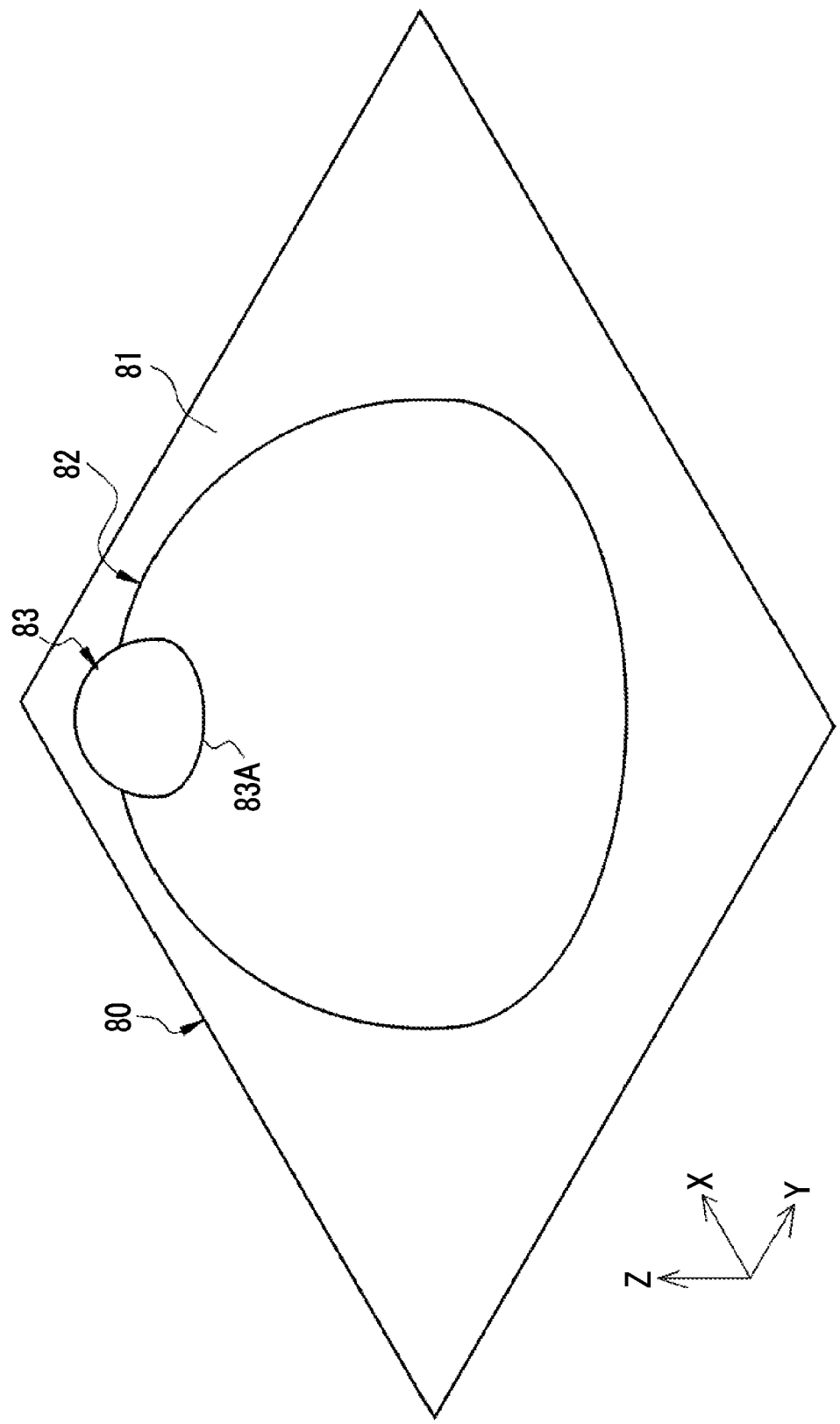
FIG. 28 is a perspective view illustrating an external appearance of another example of the touch pad.

As in a touch pad 80 illustrated in FIG. 28, the outer circumferential surface of a first three-dimensional portion 82 and a second three-dimensional portion 83 may be used as the spherical operation area.

In FIG. 28, the touch pad 80 is the same as the touch pad 13 in FIG. 6, which includes the flat portion 40 and the three-dimensional portion 41, in that the touch pad 80 has a square flat portion 81 and a first convex type three-dimensional portion 82 having a hemispherical shape is provided at the substantially center thereof. However, the second convex type three-dimensional portion 83 having a hemispherical shape is further provided on the first three-dimensional portion 82 in the touch pad 80. The second three-dimensional portion 83 is a similar figure having a size of about ¼ of the first three-dimensional portion 82 and is disposed at a position including the vertex of the first three-dimensional portion 82.

The second three-dimensional portion 83 is provided as a target which is hit by a tap operation of a user with a finger F. That is, the second three-dimensional portion 83 corresponds to a click button in a case of being replaced with a mouse. Therefore, the second three-dimensional portion 83 is registered at contact positions of the finger F corresponding to the single tap operation and the double tap operation, in operation recognition information in this case.

Figure 29B:
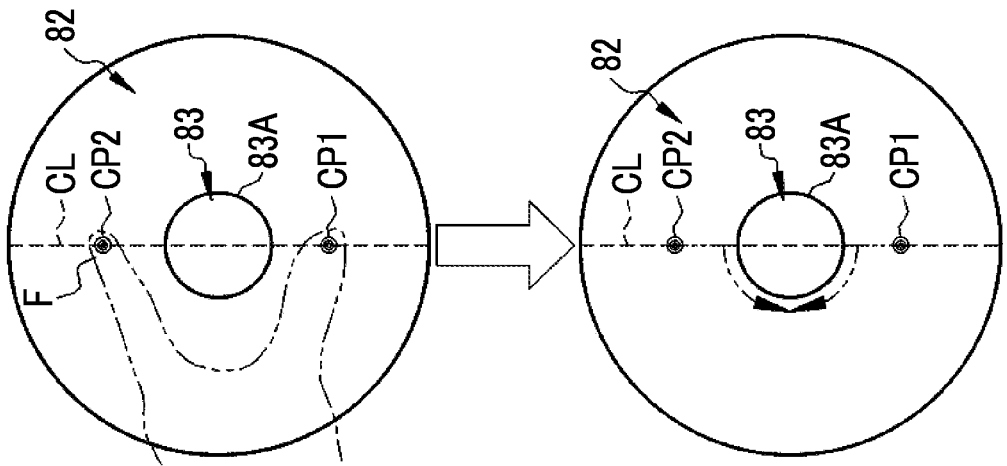
FIGS. 29A and 29B are diagrams illustrating examples of a movement trajectory of fingers for the pinch-in operation in a case of the touch pad illustrated in FIG. 28.
Figure 29A:
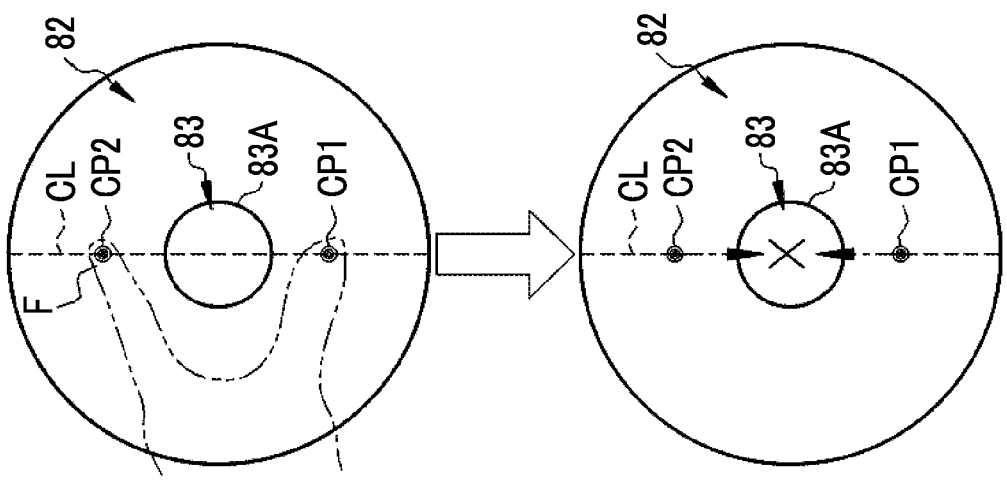

Here, in the touch pad 80, as illustrated in FIGS. 29A and 29B, a case where the contact positions CP1 and CP2 of two fingers F are on the center line CL across the second three-dimensional portion 83 is considered.

In the touch pad 13 in the first embodiment, as indicated by a two-dot chain line in the lower part of an arrow in FIG. 23, the movement trajectory of the finger F is along the center line CL. However, in the touch pad 80, since the second three-dimensional portion 83 is provided in the front of moving of the finger F, the movement trajectory of the finger F is not along the center line CL, as indicated by a two-dot chain line and an x mark in the lower part of an arrow in FIG. 29A. As indicated by a two-dot chain line in the lower part of an arrow in FIG. 29B, the movement trajectory of the finger F is an arc-shaped movement trajectory along a lower circumference 83A of the second three-dimensional portion 83, which is a boundary between the first three-dimensional portion 82 and the second three-dimensional portion 83. The arc-shaped movement trajectory is also a trajectory which is presumed to be naturally drawn in a case where two fingers F become closer to each other and is considered to allow two fingers F to become closer to each other with the minimum movement energy.

In a case where the movement trajectories of two fingers F are arc-shaped movement trajectory along the lower circumference 83A of the second three-dimensional portion 83 illustrated in FIG. 29B, the second recognition unit 76 recognizes the gesture operation of the two fingers F to be the same gesture operation as the pinch-in operation in a case where the operation area is planar.

As described above, in a case where the outer circumferential surface of the first three-dimensional portion 82 and the second three-dimensional portion 83 is set as the spherical operation area, the gesture operation of the two fingers F is recognized to be the same gesture operation as the pinch-in operation in a case where the operation area is planar, in a case where the movement trajectories of the two fingers are arc-shaped movement trajectories along the lower circumference 83A of the second three-dimensional portion 83. Accordingly, it is also possible to correctly recognize the pinch-in operation in a case where the outer circumferential surface of the first three-dimensional portion 82 and the second three-dimensional portion 83 is set as the spherical operation area.

FIGS. 29A and 29B illustrates a case where the contact positions CP1 and CP2 of the two fingers F are on the center line CL. However, it is not limited thereto. Even in a case where the contact positions CP1 and CP2 of the two fingers F are not on the center line CL, the movement trajectories of the two fingers F include an arc-shaped movement trajectory along the lower circumference 83A of the second three-dimensional portion 83 in a case where the second three-dimensional portion 83 is provided on movement paths of the two fingers F.

The second three-dimensional portion 83 is set to be a similar figure obtained by reducing the first three-dimensional portion 82. However, the first three-dimensional portion 82 may be hemispherical and the second three-dimensional portion 83 may be elliptically spherical. In addition, a reverse case may be provided.

Second Embodiment

In the first embodiment, as illustrated in FIGS. 9A to 9D, the substrate 45 on which the plating layers 46A and 46B have been formed to have a stripe shape in the X-axis direction and the Y-axis direction is projected to have a hemispherical shape, and thereby the three-dimensional portion 41 is formed. Then, the electrodes 47A and 47B are formed on the plating layers 46A and 46B. Therefore, the electrodes 47A and 47B are provided to have a straight-line shape along the X-axis direction or the Y-axis direction, in a case where the spherical operation area constituted by the outer circumferential surface of the three-dimensional portion 41 is viewed in a plan view. On the contrary, in a second embodiment illustrated in FIG. 30, the electrodes are provided on a three-dimensional portion 92 along an arc-shaped movement trajectory.

Figure 30:
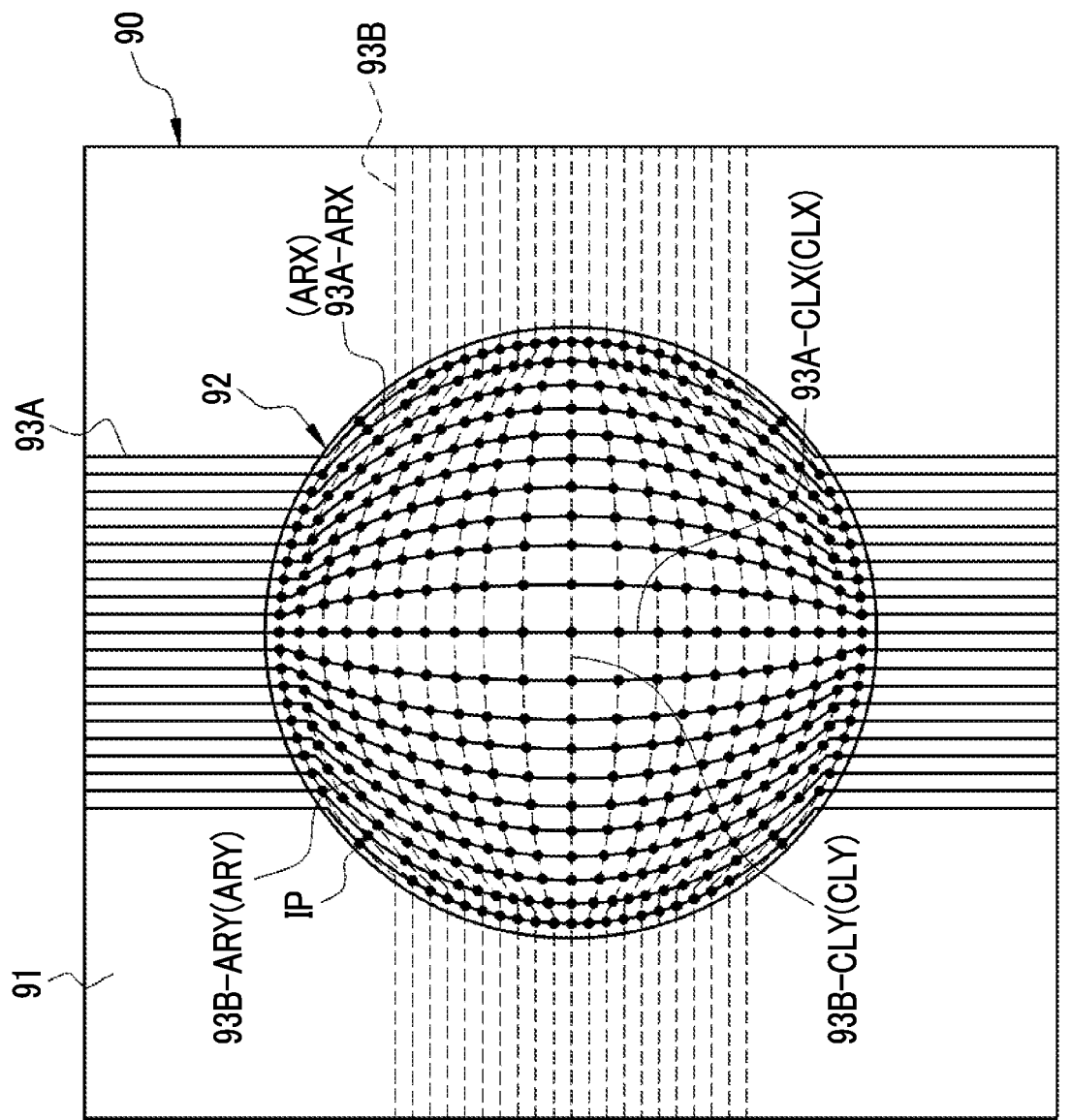
FIG. 30 is a plan view illustrating another example of the touch pad.

In FIG. 30, a touch pad 90 in the second embodiment is the same as the touch pad 13 in FIG. 6, which includes the flat portion 40 and the three-dimensional portion 41, in that the touch pad 90 has a square flat portion 91 and a convex type three-dimensional portion 92 having a hemispherical shape is provided at the substantially center thereof. However, a configuration of a first electrode 93A and a second electrode 93B is different from that in the touch pad 13.

That is, the first electrode 93A is configured by one first electrode 93A-CLX along a center line CLX of the three-dimensional portion 92 which is parallel to the X-axis, and a plurality of first electrodes 93A-ARX along a plurality of arcs ARX whose chord is the center line CLX. The second electrode 93B is configured by one second electrode 93B-CLY along a center line CLY of the three-dimensional portion 92 which is parallel to the Y-axis, and a plurality of second electrodes 93B-ARY along a plurality of arcs ARY whose chord is the center line CLY. The first electrode 93A is provided on the front surface of the touch pad 90 and the second electrode 93B is provided on the back surface thereof.

As illustrated in FIG. 21B, the arcs ARX and ARY are movement trajectories of the finger F in a case where contact positions CP1 and CP2 of two fingers F in the pinch-in operation are shifted from the center O of the three-dimensional portion 41 and have the same height. Therefore, the electrodes 93A-ARX and 93B-ARY are provided along an arc-shaped movement trajectory which is bulged outwardly in a case where a spherical operation area constituted by the outer circumferential surface of the three-dimensional portion 92 is viewed in a plan view. The shape of the electrodes 93A-CLX and 93B-CLY coincides with the movement trajectories of fingers F in a case where the contact positions CP1 and CP2 of the two fingers F are on the center lines CLX and CLY.

As described above, if the electrodes 93A and 93B are provided along an arc-shaped movement trajectory, for example, in a case where two fingers F moves along one first electrode 93A-ARX, the X coordinate is constant and only the Y coordinate is changed in coordinate information of the contact positions or the movement trajectory. Thus, it is easy to handle the coordinate information.

In the arrangement of the electrodes 47A and 47B illustrated in FIGS. 9A to 9D, the number of intersection points IP is decreased with being directed from the vertex of the three-dimensional portion 41 toward the lower circumference 41A. Thus, resolution of detecting contact of the finger F in the vicinity of the lower circumference 41A is lower than that in the vicinity of the vertex. On the contrary, in the arrangement of the electrodes 93A and 93B illustrated in FIG. 30, intersection points IP are distributed in the three-dimensional portion 92 without being separated. Thus, the resolution of detecting the contact of the finger F does not vary depending on the place.

Figure 31:
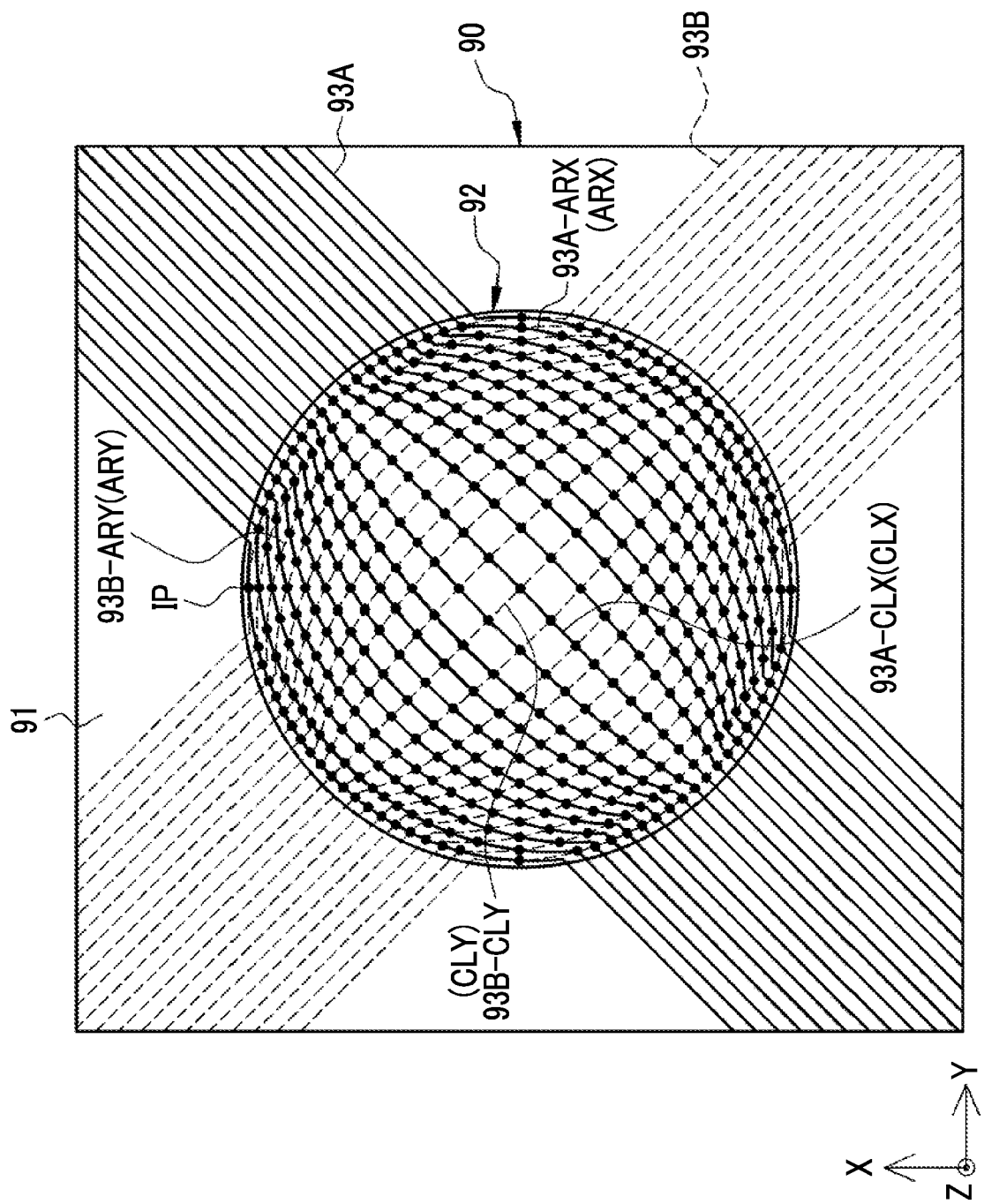
FIG. 31 is a plan view illustrating a touch pad obtained by rotating the electrodes around a Z-axis at a predetermined angle.

As illustrated in FIG. 31, the electrodes 93A and 93B may be rotated at a predetermined angle around the Z-axis from the state in FIG. 30. The predetermined angle in this case is adjusted to be an angle at which any one of the electrodes 93A or 93B is along an arc AR based on the contact positions CP1 and CP2 of the thumb and the forefinger which are naturally touched, in a case where the hand HD of the user accesses the touch pad 90. Alternatively, the touch pad 90 itself illustrated in FIG. 30 may be rotated around the Z-axis and be disposed on the center console 18.

Third Embodiment

In the above embodiments, restrictions of the gesture operation on the operation area of the touch pad are not particularly provided. However, generally, an operation lock is applied to the operation area of a touch sensor such as the touch pad, in order to prevent an erroneous operation by contact of the finger F, which is not intended by a user. In a third embodiment illustrated in FIGS. 32 to 34, the operation lock is applied to the operation area of the touch pad. The pinch-in operation has a function of releasing the operation lock. The basic configuration in the third embodiment is the same as that in the first embodiment. Therefore, descriptions will be made based on the first embodiment.

Figure 32:
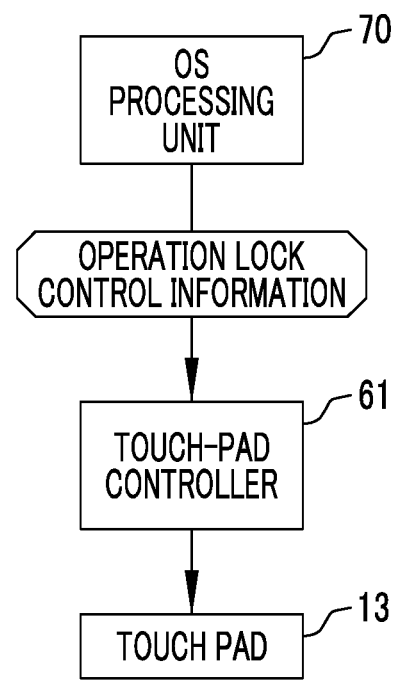
FIG. 32 is a diagram illustrating a form in which operation-lock control information of the touch pad is transmitted from an OS processing unit to the touch-pad controller.

Firstly, as illustrated in FIG. 32, the OS processing unit 70 transmits operation-lock control information of an instruction to perform or release the operation lock of the touch pad 13, to the touch-pad controller 61 (the AP interface unit 63 is not illustrated). As shown in operation-command conversion information 95 in FIG. 33, an operation command of releasing the operation lock is assigned to the pinch-in operation in addition to map reduction and the like.

Figure 34:
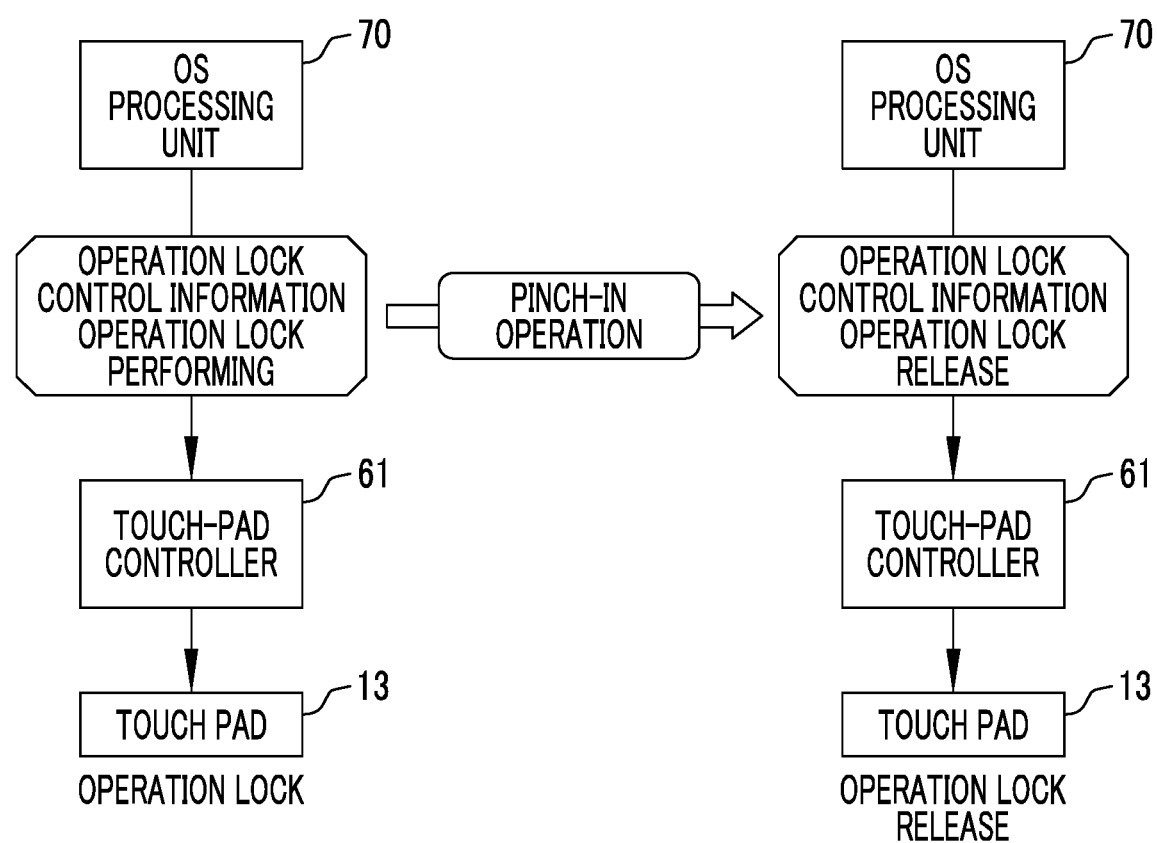
FIG. 34 is a diagram illustrating a form in which an operation lock of a touch pad is released in accordance with the pinch-in operation.

In FIG. 34, the left side illustrates a state where operation-lock control information of an instruction to perform the operation lock is transmitted from the OS processing unit 70 to the touch-pad controller 61 and thus the operation lock of the touch pad 13 is performed. In a case where the pinch-in operation is performed in this state, as illustrated on the right side, operation-lock control information of an instruction to release the operation lock is transmitted from the OS processing unit 70 to the touch-pad controller 61. Thus, the operation lock of the touch pad 13 is released.

The pinch-in operation is a gesture operation which is clearly intended by the user unlike the tap operation or the stroke operation which is not distinguished from contact of the finger, which is not intended by the user. In addition, the pinch-in operation is a gesture operation simpler than the rotary slide operation and the like. Therefore, if a configuration of releasing the operation lock of the touch pad 13 is made to correspond to the pinch-in operation, it is possible to prevent an erroneous operation by contact of the finger F, which is not intended by the user, and to relatively easily release the operation lock of the touch pad 13.

In the present invention, in a case where the movement trajectory of the finger F is an arc-shaped movement trajectory which is bulged outwardly in a case where the spherical operation area is viewed in a plan view, the gesture operation of the two fingers is recognized to be the same gesture operation as the pinch-in operation in the planar operation area. Thus, it is possible to reliably release the operation lock of the touch pad 13 by the pinch-in operation which is intended by the user.

Here, when the automobile stops, the user can perform the gesture operation while visually recognizing the touch pad 13. Thus, it is considered that an erroneous operation occurs less. Accordingly, it is preferable that the operation lock of the touch pad 13 is automatically released when the automobile stops. On the contrary, when a driver sitting on the driver's seat 20 performs a manual operation in which the driver manually operates the steering wheel 19 and drives, the user concentrates the gaze forward and has difficulty in performing a gesture operation with visually recognizing the touch pad 13. Thus, it is considered that the erroneous operation easily occurs. Thus, it is preferable that the operation lock is performed only in a case of the manual operation.

The state of the manual operation is distinguished from an automatic operation which is put into practical use in the near future. The automatic operation is a state where an operation of the steering wheel 19 and the like is automatically performed. This case is considered to be substantially the same as a state where the automobile stops. Thus, it is assumed that the state of the automatic operation is handled in the same manner as the state where the automobile stops.

Fourth Embodiment

In the pinch-in operation illustrated in FIG. 14A, at least two fingers F are moved together. On the contrary, in a fourth embodiment illustrated in FIGS. 35 and 36, a gesture operation in which one of the at least two fingers F does not move and the other finger F moves is also recognized to be the pinch-in operation. In the fourth embodiment, similar to the third embodiment, the basic configuration is also the same as that in the first embodiment. Therefore, descriptions will be made based on the first embodiment.

Figure 35:
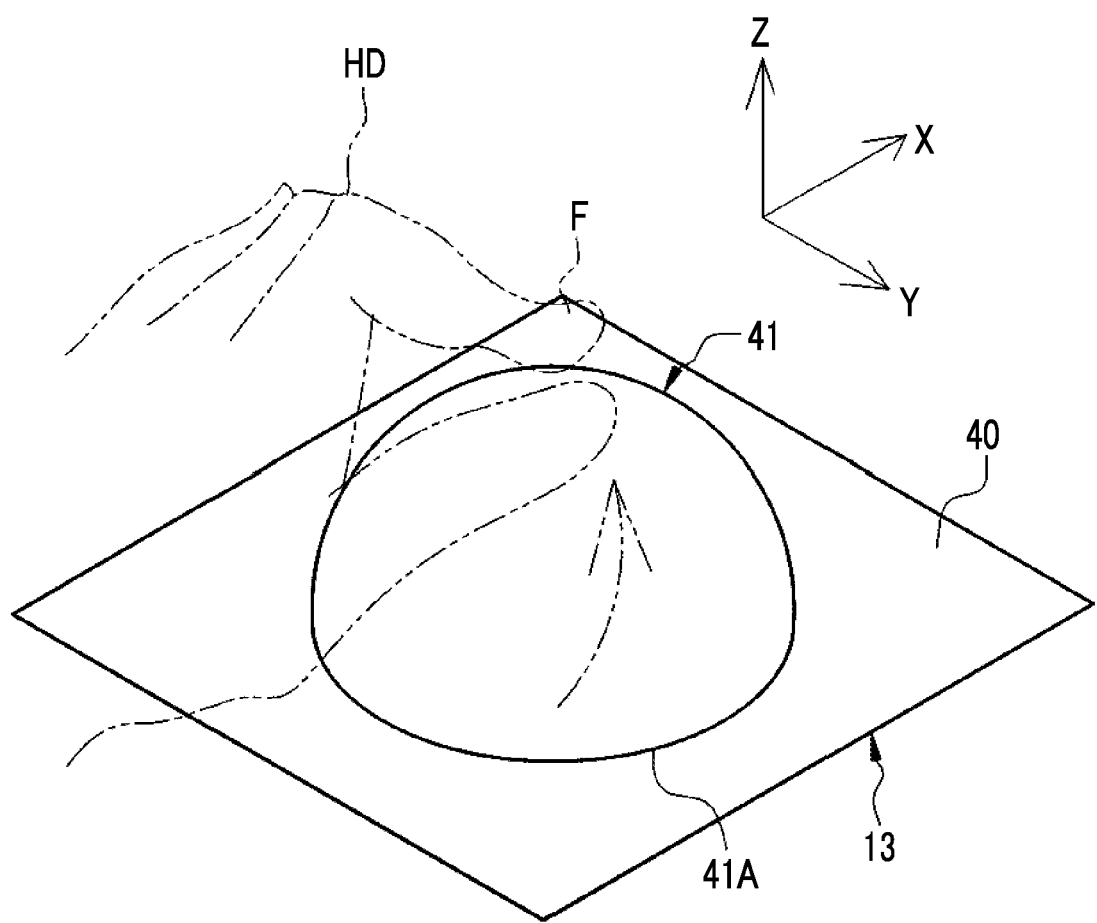
FIG. 35 is a diagram illustrating the pinch-in operation of in which one of the at least two fingers does not move and the other moves.

FIG. 35 illustrates a gesture operation in which the thumb and the forefinger corresponding to at least two fingers F are brought into contact with the three-dimensional portion 41, and then the forefinger does not move and the thumb is slid on the three-dimensional portion 41. The second recognition unit 76 also recognizes a gesture operation (referred to as a second pinch-in operation below) (illustrated in FIG. 35) in which one of the at least two fingers F does not move and the other moves to be the pinch-in operation in addition to the pinch-in operation (referred to as a first pinch-in operation below) (illustrated in FIG. 14A) of moving two fingers F together. Whether the gesture operation of two fingers F corresponds to the first pinch-in operation or the second pinch-in operation can be determined by checking a difference in change of coordinate information of the movement trajectory.

In this case, as with operation-command conversion information 100 illustrated in FIG. 36, a function performed in a case of the first pinch-in operation may be set to be different from a function performed in a case of the second pinch-in operation. Specifically, operation commands of operation lock release, map reduction at a relatively large reduction ratio, and volume increase of a relatively large change amount are assigned to the first pinch-in operation. In addition, operation commands of map reduction at a relatively small reduction ratio and volume increase of a relatively small change amount are assigned to the second pinch-in operation.

As described above, since two kinds of pinch-in operations, that is, the first pinch-in operation and the second pinch-in operation are recognized, and the functions performed by the first pinch-in operation and the second pinch-in operation are set to be different from each other, it is possible to increase variations in function to be performed.

In a case where many functions are assigned to the pinch-in operation, if the pinch-in operation is erroneously recognized to be another gesture operation and processing which is not intended by the user is performed, usability may be significantly deteriorated. However, in the present invention, since the occurrence of a situation in which processing which is not intended by the user is performed by the pinch-in operation is reliably prevented, there is no concern of the usability being significantly deteriorated.

FIG. 35 illustrates an example in which the forefinger does not move and the thumb is slid on the three-dimensional portion 41. However, conversely, a gesture operation in which the thumb does not move and the forefinger is slid on the three-dimensional portion 41 may be set to be the second pinch-in operation. Regarding the pinch-out operation, similarly, two kinds of operations of a first pinch-out operation of moving at least two fingers F together and a second pinch-out operation in which one of at least two fingers F does not move and other fingers move may be recognized and functions performed by the two kinds of pinch-out operations may be set to be different from each other.

At least two fingers F performing the pinch-in operation are not limited to the thumb and the forefinger. For example, the forefinger and the middle finger in a state of being in close contact with each other like one finger may be moved to the thumb.

The touch sensor including the spherical operation area is not limited to a touch pad which does not have the display function in each of the embodiments. A touch panel having the display function may be used as the touch sensor including the spherical operation area.

In the embodiments, for example, hardware configurations of the processing units that performs various types of processing, such as the console-device controller 15, the touch-panel controller 60, the touch-pad controller 61, the sound output controller 62, the AP interface unit 63, the OS processing unit 70, the AP execution unit 71, the first recognition unit 75, and the second recognition unit 76 correspond to various processors as follows.

The various processors include a CPU, a programmable logic device (PLD), a dedicated electric circuit, and the like. As is well known, the CPU is a general-purpose processor that executes software (program) and functions as various processing units. The PLD is a processor such as a field programmable gate array (FPGA), of which a circuit configuration can be changed after being manufactured. The dedicated electric circuit is a processor such as an application specific integrated circuit (ASIC), which has a circuit configuration designed to be dedicated for performing specific processing.

One processing unit may be configured by one of the various processors or by combination of two processors or more of the same type or the different types (for example, combination of a plurality of FPGAs or combination of a CPU and a FPGA). A plurality of processing units may be configured by one processor. As an example in which the plurality of processing units is configured by one processor, forms as follows are provided. Firstly, there is a form in which one processor is configured by combination of one or more CPUs and software and the processor functions as the plurality of processing units. Secondly, as represented by a system-on-chip (SoC), there is a form of using a processor in which functions of the entirety of a system including the plurality of processing units are realized by one IC chip. As described above, the various processing units are configured by using one or more of the various processors, as a hardware configuration.

The hardware configurations of the various processors are, more specifically, electric circuits (circuitry) in which circuit elements such as semiconductor elements are combined.

It is possible to understand a touch type operation device described in Appendix 1 as follows.

APPENDIX 1

A touch type operation device comprising:

a touch sensor that includes a spherical operation area as an operation area in which a user performs a gesture operation by bringing a finger into contact and detects the contact of the finger with the spherical operation area so as to output a detection signal, a first recognition processor that recognizes a contact position of the finger with the spherical operation area and a movement trajectory of the finger in the spherical operation area, based on the detection signal, and a second recognition processor that recognizes the gesture operation performed on the spherical operation area, based on the contact position and the movement trajectory recognized by the first recognition processor and recognizes the gesture operation of at least two fingers to be the same gesture operation as a pinch-in operation in which movement trajectories of the at least two fingers are straight lines in a case where the operation area is planar, in a case where the movement trajectories of the at least two fingers recognized by the first recognition processor are arc-shaped movement trajectories which are bulged outwardly in a case where the spherical operation area is viewed in a plan view and which correspond to the contact positions of the at least two fingers.

The present invention is not limited to the above embodiments and may employ various configurations in a range without departing from the gist of the present invention. The above-described embodiments or various modification examples may be appropriately combined. The present invention is also applied to a storage medium storing a program, in addition to the program.

EXPLANATION OF REFERENCES

10: console system
11: instrument panel
12: touch panel
13, 80, 90: touch pad
14: speaker
15: console-device controller
16: main control device 17: dash board
18: center console
18A, 18B, 18C: upper portion, central portion, lower portion
19: steering wheel
20: driver's seat
21: passenger seat
22: air conditioner
25: map display screen
26: map
27: current location mark
28: traveling route
29: first navigation information
30: second navigation information
31: menu bar
32, 32A to 32E: operation button
33: volume control bar
34: cursor
35: operation button
40, 81, 91: flat portion
41, 92: three-dimensional portion
41A: lower circumference
45: substrate
46A, 46B: plating layer
47A, 47B: first electrode, second electrode
50: first storage device
51: operation program
52: operation recognition information
60: touch-panel controller
61: touch-pad controller
62: sound output controller
63: AP interface unit
65: second storage device
66: in-vehicle OS
67: in-vehicle AP
68, 95, 100: operation-command conversion information
69: CPU
70: OS processing unit
71: AP execution unit
75: first recognition unit
76: second recognition unit
77: touch type operation device
82: first three-dimensional portion
83: second three-dimensional portion
83A: lower circumference
93A, 93A-CLX, 93A-ARX: first electrode
93B, 93B-CLY, 93B-ARY: second electrode
X: horizontal axis parallel to length direction of automobile
Y: horizontal axis parallel to width direction of automobile
Z: vertical axis
HD: hand
F: finger
TH: step
IP: intersection point
Y1 to Y7: first electrode
X1 to X7: second electrode
SXMAX, SYMAX: maximum value (external value) of detection signal
CP1, CP2: contact position of fingers
O: center of three-dimensional portion
L: straight line connecting contact positions of fingers
CL, CLX, CLY: center line of three-dimensional portion
AR, ARX, ARY: arc
TR: allowable range
W: width
ST100 to ST120, ST500 to ST540, ST521 to ST526: step

What is claimed is:

1. A touch type operation device comprising:
a touch sensor that includes a spherical operation area as an operation area in which a user performs a gesture operation by bringing a finger into contact and detects the contact of the finger with the spherical operation area so as to output a detection signal, wherein the spherical operation area includes an outer circumferential surface of a first convex type three-dimensional portion having a hemispherical shape;
a first recognition unit that recognizes a contact position of the finger with the spherical operation area and a movement trajectory of the finger in the spherical operation area, based on the detection signal of the touch sensor; and
a second recognition unit that recognizes the gesture operation performed on the spherical operation area based on the contact position and the movement trajectory recognized by the first recognition unit, and recognizes the gesture operation performed on the spherical operation area by at least two fingers to be the same gesture operation as a pinch-in operation in which movement trajectories of the at least two fingers are straight lines in a case where the operation area is planar when the movement trajectories of the at least two fingers recognized by the first recognition unit are arc-shaped movement trajectories which are bulged outwardly in a case where the spherical operation area is viewed in a plan view and which correspond to the contact positions of the at least two fingers,
wherein when the contact positions of the at least two fingers have the same height, the arc-shaped movement trajectories are along an arc which passes through the contact positions of the at least two fingers, whose chord is the center line of the first three-dimensional portion parallel to a line connecting the contact positions of the at least two fingers, in a case where the spherical operation area is viewed in the plan view.

2. The touch type operation device according to claim 1, wherein
the second recognition unit recognizes the gesture operation of the at least two fingers to be the same gesture operation as the pinch-in operation in which movement trajectories of the at least two fingers are straight lines in a case where the operation area is planar when the contact positions of the at least two fingers are on a center line of the first three-dimensional portion and the movement trajectories of the at least two fingers are along the center line, similar to the case of being the arc-shaped movement trajectories.

3. The touch type operation device according to claim 2, wherein the spherical operation area includes the outer circumferential surface of the first convex type three-dimensional portion having the hemispherical shape and an outer circumferential surface of a second convex type three-dimensional portion having a hemispherical shape which is disposed at a position including a vertex of the first three-dimensional portion, the second convex type three-dimensional portion has a size smaller than a size of the first three-dimensional portion, and
the arc-shaped movement trajectories are along a lower circumference of the second three-dimensional portion, which is a boundary between the first three-dimensional portion and the second three-dimensional portion.

4. The touch type operation device according to claim 1, wherein the spherical operation area includes the outer circumferential surface of the first convex type three-dimensional portion having the hemispherical shape and an outer circumferential surface of a second convex type three-dimensional portion having a hemispherical shape which is disposed at a position including a vertex of the first three-dimensional portion, the second convex type three-dimensional portion has a size smaller than a size of the first three-dimensional portion, and the arc-shaped movement trajectories are along a lower circumference of the second three-dimensional portion, which is a boundary between the first three-dimensional portion and the second three-dimensional portion.

5. The touch type operation device according to claim 1, wherein the second recognition unit determines that the movement trajectory recognized by the first recognition unit coincides with the arc-shaped movement trajectory, in a case where an error between the movement trajectory recognized by the first recognition unit and the arc-shaped movement trajectory is within an allowable range.

6. The touch type operation device according to claim 5, wherein the allowable range is set based on an average value of widths of the fingers.

7. The touch type operation device according to claim 1, wherein a first electrode and a second electrode for outputting the detection signal are arranged in the operation area in a matrix, and the first recognition unit recognizes an intersection point between the first electrode and the second electrode to be the contact position, based on the detection signal of the first electrode and the second electrode.

8. The touch type operation device according to claim 7, wherein the first recognition unit recognizes an intersection point at which the detection signal of the first electrode and the second electrode has an external value among a plurality of intersection points adjacent to the first electrode and the second electrode, to be the contact position.

9. The touch type operation device according to claim 7, wherein the first electrode and the second electrode are provided along the arc-shaped movement trajectory.

10. The touch type operation device according to claim 1, wherein an image displayed in a display is reduced in accordance with the pinch-in operation.

11. The touch type operation device according to claim 1, wherein an operation lock of the touch sensor is released in accordance with the pinch-in operation.

12. The touch type operation device according to claim 1, wherein a function performed in a case where the movement trajectory recognized by the first recognition unit is a movement trajectory in which all of the at least two fingers moves is different from a function performed in a case where the movement trajectory recognized by the first recognition unit is a movement trajectory in which one of the at least two fingers does not move and the other moves.

13. The touch type operation device according to claim 1, wherein the touch type operation device is mounted in a vehicle.

14. An operation method of the touch type operation device according to claim 1 which includes the touch sensor that includes the spherical operation area as the operation area in which the user performs the gesture operation by bringing the finger into contact and detects the contact of the finger with the spherical operation area so as to output the detection signal, wherein the spherical operation area includes the outer circumferential surface of the first convex type three-dimensional portion having the hemispherical shape, the operation method comprising:

a first recognition step of recognizing the contact position of the finger with the spherical operation area and a movement trajectory of the finger in the spherical operation area, based on the detection signal of the touch sensor; and a second recognition step of recognizing the gesture operation performed on the spherical operation area based on the contact position and the movement trajectory recognized in the first recognition step, and of recognizing the gesture operation performed on the spherical operation area by the at least two fingers to be the same gesture operation as the pinch-in operation in which movement trajectories of the at least two fingers are straight lines in a case where the operation area is planar, when the movement trajectories of the at least two fingers recognized in the first recognition step are the arc-shaped movement trajectories which are bulged outwardly in a case where the spherical operation area is viewed in a plan view and which correspond to the contact positions of the at least two fingers, wherein when the contact positions of the at least two fingers are recognized to have the same height, the arc-shaped movement trajectories are along an arc which passes through the contact positions of the at least two fingers, whose chord is the center line of the first convex type three-dimensional portion parallel to a line connecting the contact positions of the at least two fingers, in a case where the spherical operation area is viewed in the plan view.

15. A non-transitory computer readable recording medium storing an operation program for the touch type operation device according to claim 1 which includes the touch sensor that includes the spherical operation area as the operation area in which a user performs the gesture operation by bringing the finger into contact and detects the contact of the finger with the spherical operation area so as to output the detection signal, wherein the spherical operation area includes the outer circumferential surface of the first convex type three-dimensional portion having the hemispherical shape, the operation program causing a computer to perform:

a first recognition function of recognizing the contact position of the finger with the spherical operation area and a movement trajectory of the finger in the spherical operation area, based on the detection signal of the touch sensor; and a second recognition function of recognizing the gesture operation performed on the spherical operation area based on the contact position and the movement trajectory recognized by the first recognition function, and of recognizing the gesture operation performed on the spherical operation area by the at least two fingers to be the same gesture operation as the pinch-in operation in which movement trajectories of the at least two fingers are straight lines in a case where the operation area is planar, when the movement trajectories of the at least two fingers recognized by the first recognition function are the arc-shaped movement trajectories which are bulged outwardly in a case where the spherical operation area is viewed in a plan view and which correspond to the contact positions of the at least two fingers, wherein when the contact positions of the at least two fingers are recognized to have the same height, the arc-shaped movement trajectories are along an arc which passes through the contact positions of the at least two fingers, whose chord is the center line of the first convex type three-dimensional portion parallel to a line connecting the contact positions of the at least two fingers, in a case where the spherical operation area is viewed in the plan view.

16. A touch type operation device comprising:

a touch sensor that includes a spherical operation area as an operation area in which a user performs a gesture operation by bringing a finger into contact and detects the contact of the finger with the spherical operation area so as to output a detection signal, wherein the spherical operation area includes an outer circumferential surface of a first convex type three-dimensional portion having a hemispherical shape;

a first recognition processor that recognizes a contact position of the finger with the spherical operation area and a movement trajectory of the finger in the spherical operation area, based on the detection signal; and a second recognition processor that recognizes the gesture operation performed on the spherical operation area, based on the contact position and the movement trajectory recognized by the first recognition processor and recognizes the gesture operation performed on the spherical operation area by at least two fingers to be the same gesture operation as a pinch-in operation in which movement trajectories of the at least two fingers are straight lines in a case where the operation area is planar, when the movement trajectories of the at least two fingers recognized by the first recognition processor are arc-shaped movement trajectories which are bulged outwardly in a case where the spherical operation area is viewed in a plan view and which correspond to the contact positions of the at least two fingers, wherein when the contact positions of the at least two fingers have the same height, the arc-shaped movement trajectories are along an arc which passes through the contact positions of the at least two fingers, whose chord is the center line of the first convex type three-dimensional portion parallel to a line connecting the contact positions of the at least two fingers, in a case where the spherical operation area is viewed in the plan view.

* * * * *